(12) United States Patent
Nam et al.

(10) Patent No.: US 11,465,202 B2
(45) Date of Patent: Oct. 11, 2022

(54) THREE DIMENSIONAL CHIRAL NANOSTRUCTURES

(71) Applicants: SEOUL NATIONAL UNIVERSITY R&DB FOUNDATION, Seoul (KR); Global Frontier Center for Multiscale Energy Systems, Seoul (KR)

(72) Inventors: Ki-Tae Nam, Seoul (KR); Hye-Eun Lee, Seoul (KR); Hyo-Yong Ahn, Seoul (KR); Nam-Heon Cho, Goyang-si (KR)

(73) Assignee: SEOUL NATIONAL UNIVERSITY R&DB FOUNDATION, Seoul (KR)

( * ) Notice: Subject to any disclaimer, the term of this patent is extended or adjusted under 35 U.S.C. 154(b) by 102 days.

(21) Appl. No.: 16/609,562

(22) PCT Filed: Apr. 1, 2019

(86) PCT No.: PCT/KR2019/003819
§ 371 (c)(1),
(2) Date: Oct. 30, 2019

(87) PCT Pub. No.: WO2019/194509
PCT Pub. Date: Oct. 10, 2019

(65) Prior Publication Data
US 2021/0023615 A1    Jan. 28, 2021

(30) Foreign Application Priority Data

Apr. 6, 2018  (KR) .................. KR10-2018-0040233
Mar. 7, 2019  (KR) .................. KR10-2019-0026379

(51) Int. Cl.
*B22F 1/102* (2022.01)
*B82B 1/00* (2006.01)
(Continued)

(52) U.S. Cl.
CPC .............. *B22F 1/102* (2022.01); *B22F 1/054* (2022.01); *B22F 1/16* (2022.01); *B82B 1/00* (2013.01);
(Continued)

(58) Field of Classification Search
CPC .................................. B22F 1/102; B22F 1/16
(Continued)

(56) References Cited

U.S. PATENT DOCUMENTS

2016/0167136 A1   6/2016 Kotov et al.
2017/0120327 A1   5/2017 Balachandran et al.

FOREIGN PATENT DOCUMENTS

CN    105036070    11/2015
CN    106238728    12/2016
(Continued)

OTHER PUBLICATIONS

Chinese Office Action—Chinese Application No. 201980002228.5 dated Mar. 31, 2021, citing CN 105036070, TW 201620159, CN 106238728, CN 107552778, KR 10-2014-0048400, US 2016/0167136, KR 10-1368404, and JP 2017-082305.
(Continued)

*Primary Examiner* — Weiping Zhu
(74) *Attorney, Agent, or Firm* — Cantor Colburn LLP

(57) ABSTRACT

A three-dimensional chiral nanostructure according to an embodiment of the present invention comprises: metal nanoparticles having a chiral structure: and a coating layer enclosing the metal nanoparticles. The metal nanoparticle is formed in a polyhedral structure having an R region and an S region in which atoms are arranged clockwise and counterclockwise, respectively, in the order of (111), (100), and (110) crystal faces on the basis of the chiral center, wherein
(Continued)

at least a portion of the edges form a curve tilting and extending from the R or S region so that the metal nanoparticle has a chiral structure.

20 Claims, 24 Drawing Sheets

(51) Int. Cl.
    *B82B 3/00* (2006.01)
    *C09K 11/02* (2006.01)
    *C09K 11/59* (2006.01)
    *B22F 1/16* (2022.01)
    *B22F 1/054* (2022.01)
    *B82Y 20/00* (2011.01)
    *B82Y 30/00* (2011.01)
    *B82Y 40/00* (2011.01)

(52) U.S. Cl.
    CPC .......... *B82B 3/0009* (2013.01); *C09K 11/025* (2013.01); *C09K 11/59* (2013.01); *B22F 2301/255* (2013.01); *B22F 2302/256* (2013.01); *B22F 2999/00* (2013.01); *B82Y 20/00* (2013.01); *B82Y 30/00* (2013.01); *B82Y 40/00* (2013.01)

(58) Field of Classification Search
    USPC .......................................................... 419/23
    See application file for complete search history.

(56) References Cited

FOREIGN PATENT DOCUMENTS

| CN | 107552778 | 1/2018 |
| JP | 2017082305 | 5/2017 |
| KR | 20100106847 | 10/2010 |
| KR | 101368404 | 2/2014 |
| KR | 20140021735 | 2/2014 |
| KR | 101485446 | 1/2015 |
| KR | 20150096187 | 8/2015 |
| KR | 20160007239 | 1/2016 |
| KR | 101688210 | 12/2016 |
| TW | 201620159 | 6/2019 |

OTHER PUBLICATIONS

Korean Office Action—Korean Application No. 10-2019-0026379 dated Jun. 18, 2020, citing US 2016/0167136, KR 10-2016-0007239, KR 10-2010-0106847, and KR 10-1368404.
Gansel, et al., Gold Helix Photonic Metamaterial as Broadband Circular Polarizer, Science Magazine, Sep. 2009, pp. 1513-1515.
International Search Report—PCT/KR2019/003819 dated Jul. 5, 2019.
Mukherjee, et al., Synthesis of Chiral Gold Nanoparticle by Direct Reduction with L and D-Serine and Enhanced Anti-Mycobacterial Activity by D-Serine Protected Gold Nanoparticle, Modern Chemistry & Applications, 2015, pp. 1-6.
Orme, et al., Formation of chiral morphologies through selective binding of amino acids to calcite surface steps, Letters to Nature, Jun. 2001, pp. 775-779.

THREE DIMENSIONAL CHIRAL NANOSTRUCTURES

CROSS-REFERENCE TO RELATED APPLICATIONS

This application is a national entry of PCT Application No. PCT/KR2019/003819 filed on Apr. 1, 2019, which claims priority to and the benefit of Korean Application No. 10-2018-0040233 filed on Apr. 6, 2018; and Korean Application No. 10-2019-0026379 filed on Mar. 7, 2019, in the Korean Patent Office, the entire contents of which are incorporated herein by reference.

TECHNICAL FIELD

The present disclosure relates to a three-dimensional chiral nanostructure, and more particularly, a three-dimensional nanostructure having chiral properties.

BACKGROUND ART

A chiral structure refers to a structure having an asymmetrical form which does not have mirror image symmetry. In a chiral structure, as an electric dipole and a magnetic dipole, generated by incident electromagnetic waves, interact with each other in the same direction, degeneracy of right polarization and left polarization may be broken. Thus, a chiral structure may have different refractive indices for right polarized light and left polarized light. Accordingly, when linear polarized light is incident to a chiral material, optical activity in which a polarized state rotates may appear. A chiral structure may be used in a variety of fields of optical materials and catalysts using such optical activity properties.

DISCLOSURE

Technical Problem

An aspect of the present disclosure is to provide a three-dimensional chiral nanostructure having high optical activity.

Technical Solution

According to an aspect of the present disclosure, a three-dimensional chiral nanostructure includes a metal nanoparticle having a chiral structure; and a coating layer enclosing the metal nanoparticle.

According to an aspect of the present disclosure, a three-dimensional chiral nanostructure includes a metal nanoparticle having a polyhedral structure including an R region in which atoms are arranged in a clockwise direction and an S region in which atoms are arranged in a counterclockwise direction, in an order of crystal planes of (111), (100), and (110) with reference to a chiral center, where at least a portion of edges of the metal nanoparticle is tilted and expanded from the R region or the S region and forms a curved surface such that the metal nanoparticle has a chiral structure.

According to an aspect of the present disclosure, a three-dimensional chiral metal nanoparticle includes a seed region formed of a first metal; and a heterogeneous region disposed on an external side of the seed region to enclose the seed region and formed of a second metal.

Advantageous Effects

According to an example embodiment of the present disclosure, a three-dimensional chiral nanostructure having high optical activity may be provided by using metal nanoparticles.

Various advantages and effects of the present disclosure are not limited to the above-described features and may be easily understood while specific example embodiments of the present disclosure are described.

BEST MODE FOR INVENTION

Figure 1:
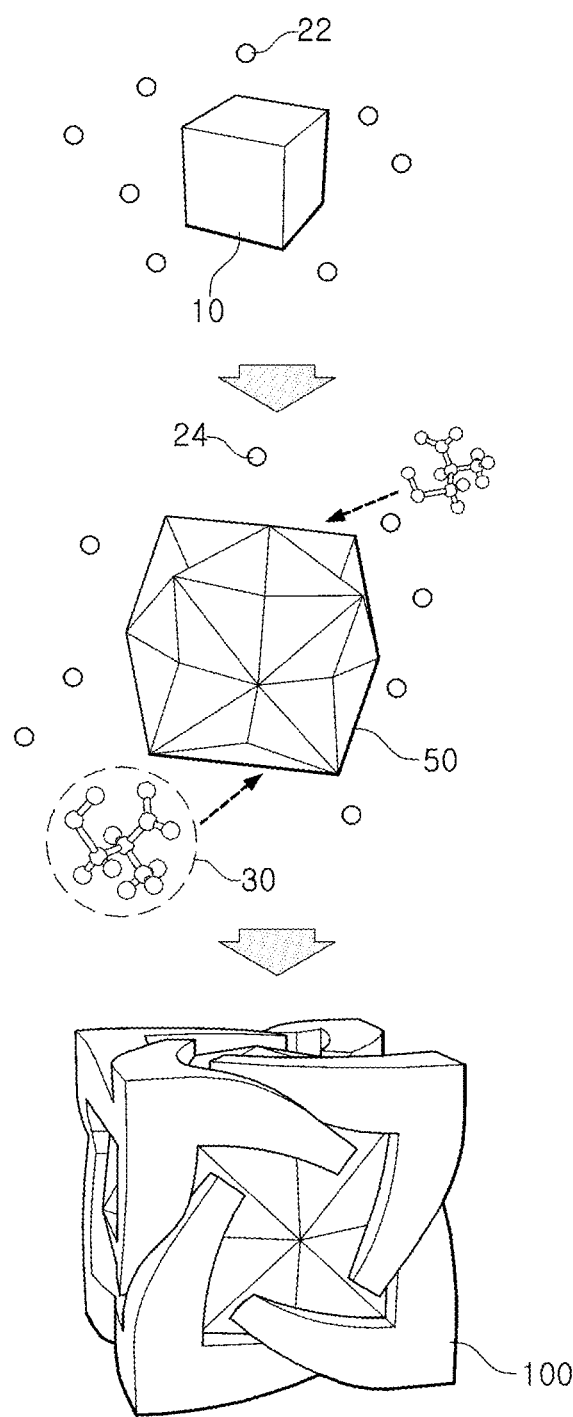
FIG. 1 is a schematic diagram illustrating a method of fabricating a three-dimensional chiral metal nanoparticle according to an example embodiment of the present disclosure.

Hereinafter, example embodiments of the present disclosure will be described with reference to the accompanying drawings.

Example embodiments of the present disclosure may be modified in various manners or various example embodiments may be combined with one another, and a scope of the present disclosure may not be limited to the example embodiments described below. Also, the example embodiments may be provided to completely describe the present disclosure to a person having ordinary skill in the art. Thus, shapes, sizes, and the like, of the elements in the drawings may be exaggerated for clarity of description, and the elements denoted by the same reference numeral in the drawings may be the same elements.

FIG. 1 is a schematic diagram illustrating a method of fabricating a three-dimensional chiral metal nanoparticle according to an example embodiment.

Referring to FIG. 1, a method of fabricating a three-dimensional chiral metal nanoparticle according to an example embodiment may include forming a first seed particle 10, forming a second seed particle 50 of a high Miller index by growing a metal seed particle 10, and forming a metal nanoparticle 100 having a chiral structure by growing the second seed particle 50.

The forming the first seed particle 10 may include forming a spherical seed by adding a first reductant to a solution including a first metal precursor 22 and a surfactant, and allowing the spherical seed to react with a first growth solution including a capping agent having a positive charge and a second reductant, thereby forming the first seed particle 10.

The spherical seed may be formed by reduction of a metal ion of the first metal precursor 22 by the first reductant. The first metal precursor 22 may include, for example, chloroauric acid ($HAuCl_4$), the surfactant may include cetyltrimethylammonium bromide (($C_{16}H_{33}$)$N(CH_3)_3Br$, CTAB), and the first reductant may include sodium borohydride ($NaBH_4$).

The first seed particle 10 may be formed by reduction of a metal ion of the first metal precursor 22 onto a surface of the spherical seed in the first growth solution. The first growth solution may further include the first metal precursor 22. The capping agent may prevent reduction of a metal ion, and the second reductant may facilitate reduction of the metal ion. The capping agent may include cetyltrimethylammonium bromide (CTAB), cetyltrimethylammonium chloride (CTAC), cetylpyridinium chloride (CPC), or polyvinylpyrrolidone (PVP). The second reductant may include ascorbic acid or a material having the same level of oxidation potential as a level of oxidation potential of ascorbic acid, such as hydroxylamine, hydroquinone, succinic acid, or the like.

As illustrated in FIG. 1, the first seed particle 10 may have a cubic shape, but in example embodiments, the first seed particle 10 may have various other shapes such as a bar, a plate shape, a hexahedral shape, an octahedral shape, a dodecahedral shape, or the like. A shape of the first seed particle 10 may be determined by a concentration ratio between the capping agent and the second reductant in the first growth solution. The first seed particle 10 may include at least one of gold (Au), silver (Ag), copper (Cu), aluminum (Al), platinum (Pt), and palladium (Pd), or may be formed of alloys thereof, but an example embodiment thereof is not limited thereto. The first seed particle 10 may have a size of 10 nm to 50 nm, for example.

The forming the second seed particle 50 may include forming the second seed particle 50 having a crystal plane of a high Miller index from the first seed particle 10 by allowing the first seed particle 10 to react with the second growth solution including the second metal precursor 24, the capping agent, the second reductant, and an organic material 30 having a thiol group.

The second growth solution may further include the second metal precursor 24. A concentration of the second reductant in the second growth solution may be higher than a concentration of the second reductant in the first growth solution. The second metal precursor 24 may be the same as or different from the first metal precursor 22. The second seed particle 50 may be formed by reduction of a metal ion of the second metal precursor 24 onto a surface of the first seed particle 10 in the second growth solution. The organic material 30 may be a material having a thiol group, and may include at least one of cysteamine, 2-Naphthalenethiol (2-NT), 4-Aminothiophenol (4-ATP), 2-Aminothiophenol (2-ATP), lipoic acid, and 3,3'-Diethylthiadicarbocyanine iodide (DTDC I). The organic material 30 may be peptide including cysteine (Cys), and may include at least one of cysteine (Cys) and glutathione, for example. The peptide may include both a D-form and a L-form, enantiomers. A ratio between metal ions and organic particles of the organic material 30 in the second growth solution may be 200:1, and accordingly, at an early stage of reaction, metal ions may allow a surface of the first seed particle 10 to grow.

In an example embodiment, the second growth solution may be prepared by adding, to 3.95 mL of water, 0.8 mL of CTAB in concentration of 100 mM as the capping agent, 0.1 mL of chloroauric acid in concentration of 10 mM as the second metal precursor 24, and 0.475 mL of ascorbic acid in concentration of 0.1 M as the second reductant.

As illustrated in FIG. 1, in the aforementioned example embodiment, the second seed particle 50 having a tetracontaoctagon shape may be fabricated by growing a metal by reduction on a crystal plane of {100} of the first seed particle 10 having a cubic form. However, the shape of the second seed particle 50 may change by a material of the second seed particle 50, a type of the organic material 30, reaction conditions, and the like, and may not be limited to a tetracontaoctagon shape. For example, the second seed particle 50 may have crystal planes having a high Miller index. A crystal plane having a high Miller index may refer to, in relation to a Miller index expressed by {hkl} which indicates properties of a crystal plane, a crystal plane satisfying conditions of h>0, k>0, and l>0, and may particularly refer to a crystal plane formed by combination of {100}, {110}, and {111}, and the like, crystal planes having a low Miller index. As for a nanoparticle formed with crystal planes having a high Miller index, a single nanoparticle may have numerous exposed planes, 20 or higher, and a curvature of an edge or a corner at which crystal planes are combined with one another may be higher than a curvature of each of crystal planes having a low Miller index.

The forming the metal nanoparticle 100 may include forming the metal nanoparticle 100 having a chiral structure by continuous growth of the second seed particle 50 in the second growth solution.

The second seed particle 50 may grow asymmetrically as compared to the organic material 30. A shape of the metal nanoparticle 100 may be varied depending on a type of the organic material 30. The organic material 30 may be absorbed to a portion of a surface of the second seed particle 50, which may interfere with attachment of a metal ion. Thus, regions of a surface of the second seed particle 50 may be grown at different speeds such that the metal nanoparticle 100 having a chiral structure may be formed. The metal nanoparticle 100 may have a size of 50 nm to 500 nm, but the size of the metal nanoparticle 100 is not limited thereto.

Figure 2A:
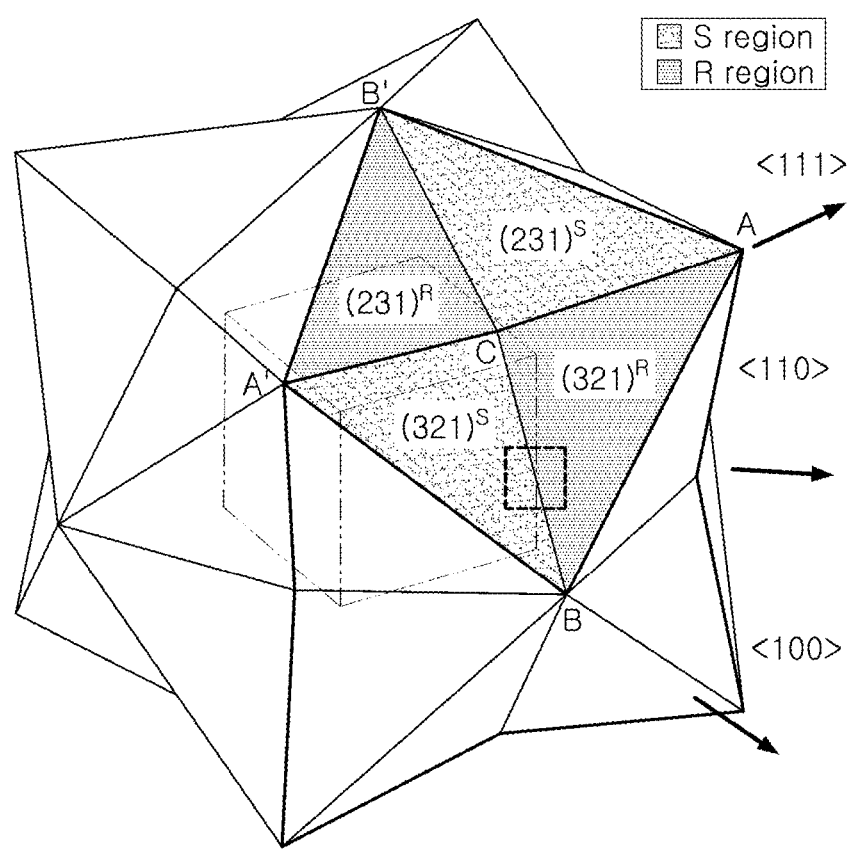
FIGS. 2A and 2B are diagrams illustrating properties of a second seed particle according to an example embodiment of the present disclosure.
Figure 2B:
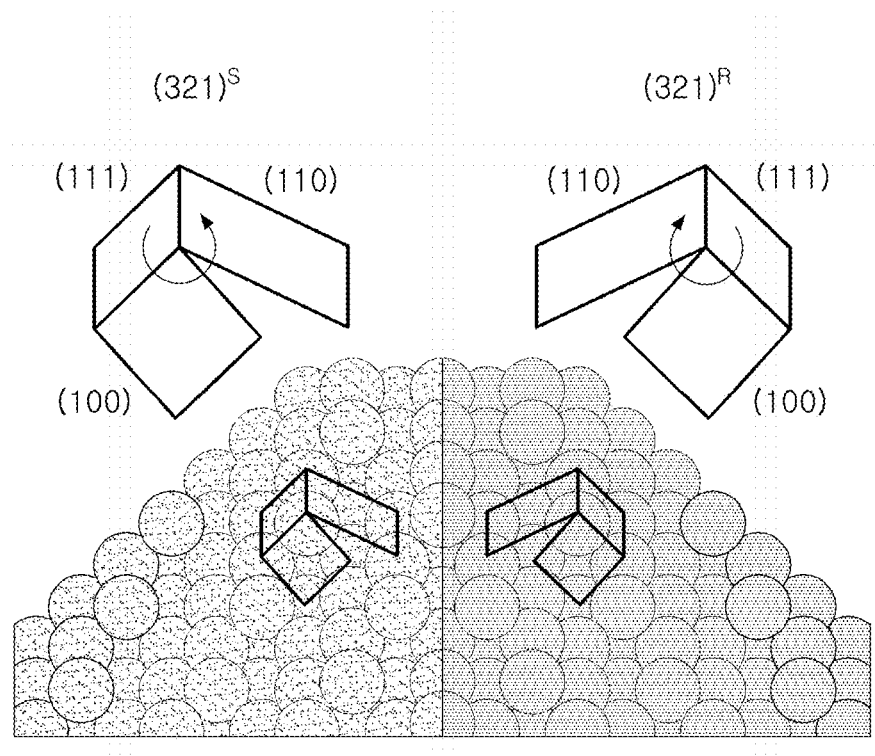

FIGS. 2A and 2B are diagrams illustrating properties of a second seed particle according to an example embodiment.

Referring to FIGS. 2A and 2B, the second seed particle 50 having a tetracontaoctagon shape described with reference to FIG. 1 may have 48 planes each having a triangular shape, and each plane has a high Miller index of {321}. The 48 planes may include an R region in which an arrangement of atoms on a surface changes in a clockwise direction and an S region in which an arrangement of atoms changes in a counterclockwise direction, in an order of crystal planes of (111), (100), and (110) with reference to a kink atom. As each of the R region and the S region includes 24 planes, the second seed particle 50 may have achiral properties.

In a process of growth of the metal nanoparticle 100 described with reference to FIG. 1, the organic material 30 may be absorbed to one of the R region and the S region. Accordingly, a speed of growth of the R region in a vertical direction may be lower than a speed of growth of the S region, or a speed of growth of the S region in the vertical direction may be lower than a speed of growth of the R region. Thus, a boundary between the R region and the S region may be shifted or tilted from the R region to the S region or from the S region to the R region.

Figure 3A:
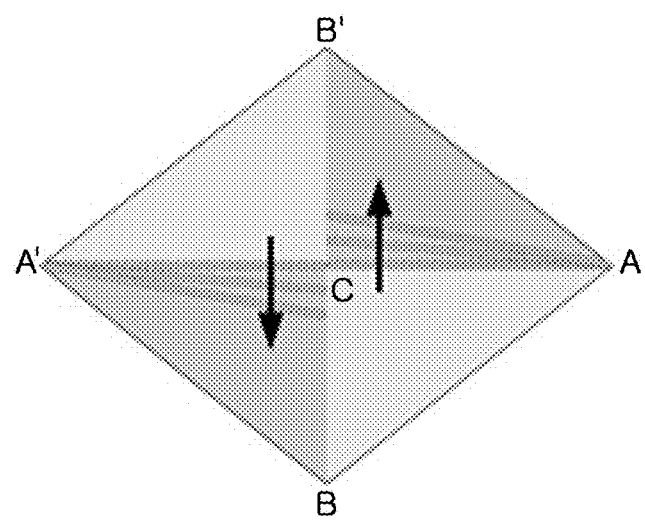
FIGS. 3A and 3D are diagrams illustrating a process of growth of a metal nanoparticle according to an example embodiment of the present disclosure.
Figure 3B:
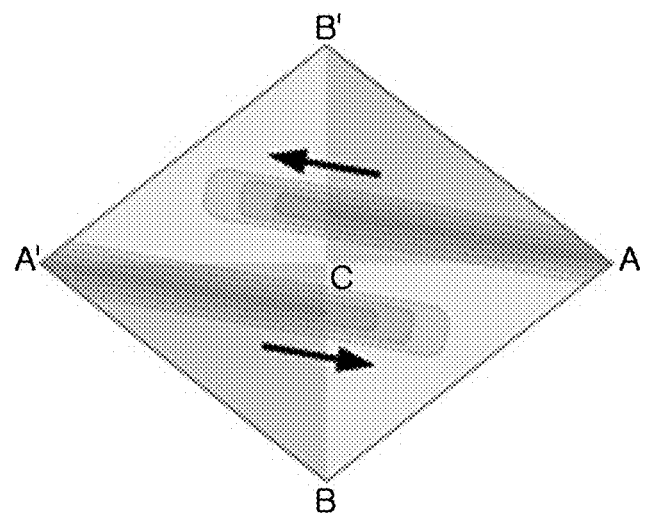
Figure 3C:
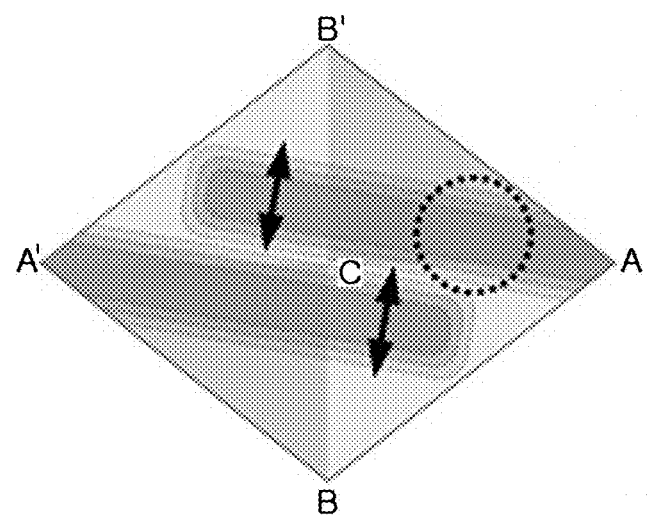
Figure 3D:
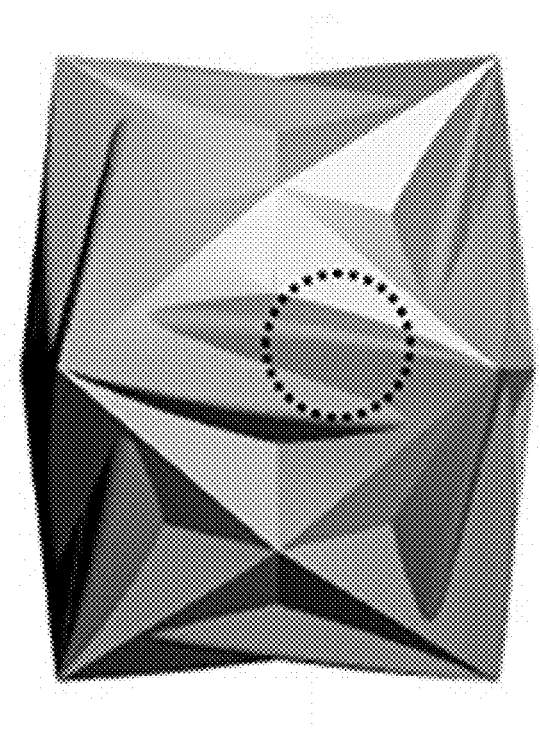

FIGS. 3A and 3D are diagrams illustrating a process of growth of a metal nanoparticle according to an example embodiment. FIGS. 3A and 3D illustrate a surface viewed in a direction of <110>, a region corresponding to region ABB'A' illustrated in FIG. 2.

Figure 4:
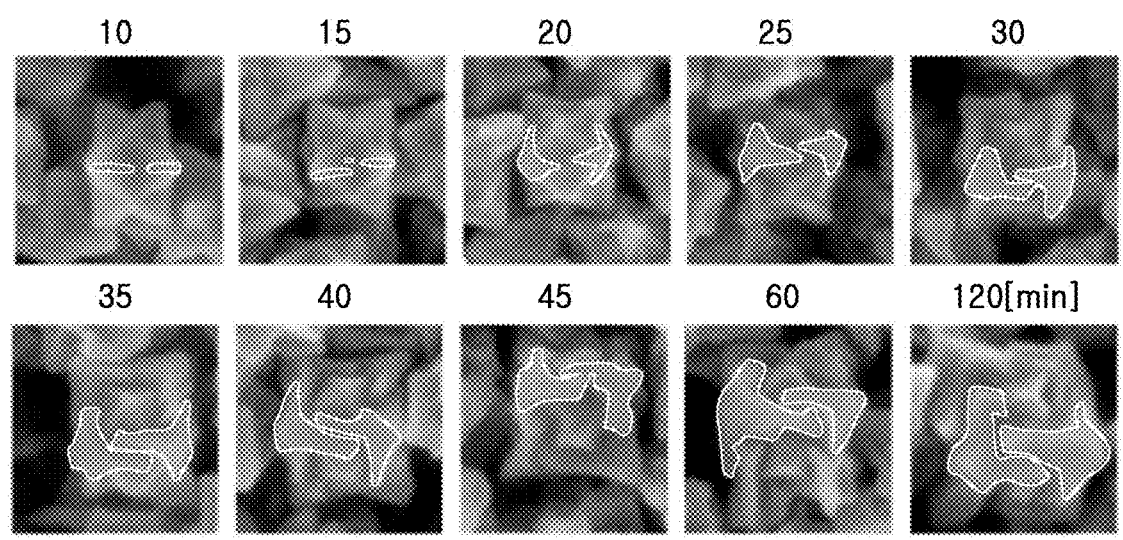
FIG. 4 is images showing a process of growth of a metal nanoparticle over time captured by an electron microscope according to an example embodiment of the present disclosure.

FIG. 4 is images showing a process of growth of a metal nanoparticle over time captured by an electron microscope according to an example embodiment.

In FIGS. 3A to 4, a structure fabricated using a first seed particle 10 having a cubic shape and formed of gold (Au) and using L-cysteine (Cys) as an organic material 30 is illustrated. As illustrated in FIG. 3A, in a boundary between an R region and an S region in a horizontal direction, an edge may be grown and tilted from the R region to the S region marked by dark gray. As illustrated in FIG. 4, the tilted angle may gradually increase for about 20 minutes. When L-cysteine (Cys) is used as an organic material 30, an edge may be expanded from the S region to the R region.

As a subsequent stage, as illustrated in FIG. 3B, the tilted edge may be grown in a length direction. The tilted edge may be grown in a length direction such that the tilted edge may extend to the adjacent R region on the left side. As illustrated in FIG. 4, the growth in a length direction may be performed for about 40 minutes.

As illustrated in FIG. 3C, the tilted edge may be grown in a thickness direction, a width direction. Accordingly, a width of the edge may increase. As illustrated in FIG. 4, the growth in a length direction may be performed after 45 minutes.

After going through the above-described growth process, a metal nanoparticle having a chiral structure may be formed as illustrated in FIG. 3D. When D-cysteine (Cys) is used as the organic material 30, a metal nanoparticle having a mirror image as in FIG. 3D may be formed. The metal nanoparticle may be grown from a first seed particle having a cubic shape to a second seed particle having a tetracontaoctagon shape, and as edges corresponding to the edges of the cubic shape of the first seed particle are tilted and grown as described above, the metal nanoparticle may have a structure in which each of the edges have a curved surface. The edges may have a curved shape or a twisted shape such that the R regions may be expanded to the S regions or the R regions may be expanded to the R regions in a counterclockwise direction with reference to a corner taken in a direction of <110>.

Figure 5A:
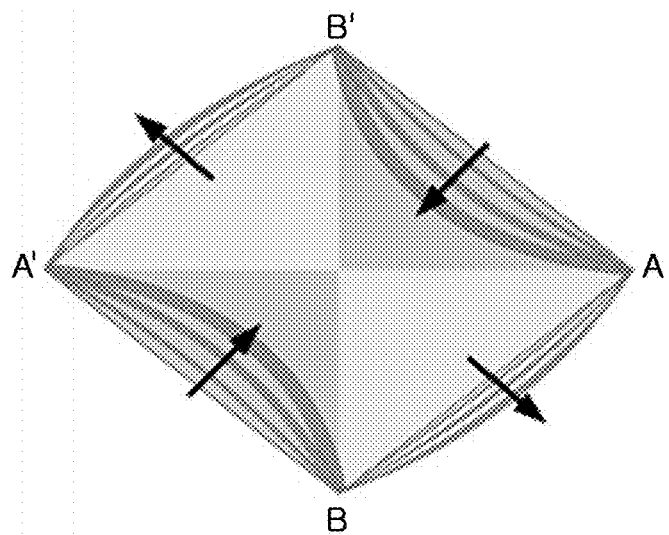
FIGS. 5A to 5D are diagrams illustrating a process of growth of a metal nanoparticle according to an example embodiment of the present disclosure.
Figure 5B:
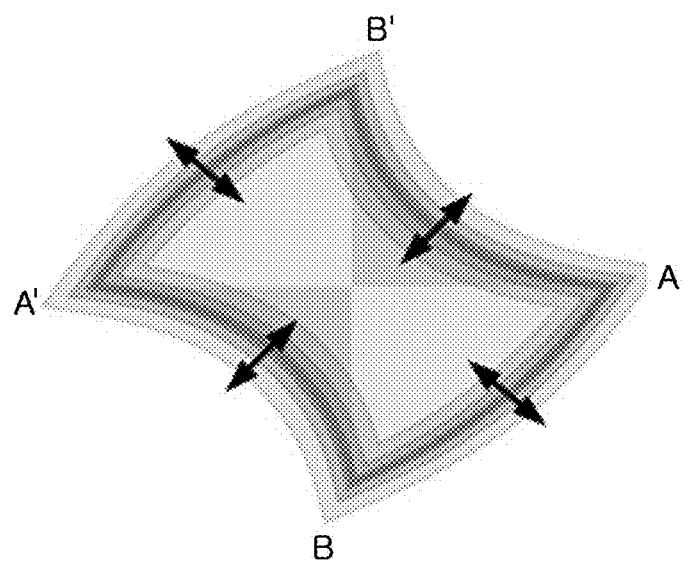
Figure 5C:
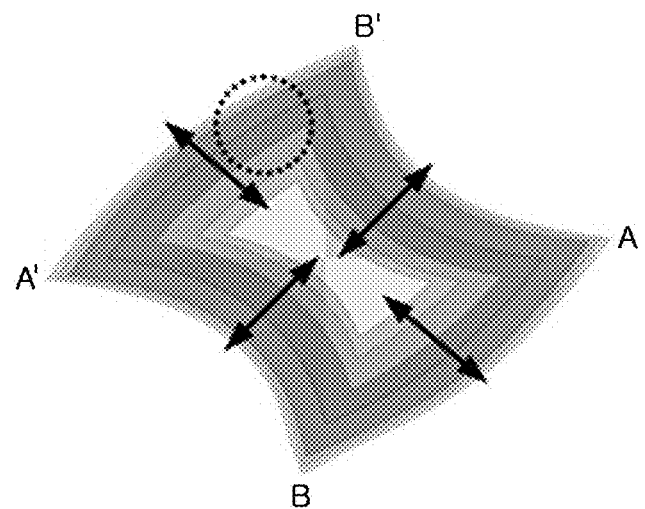

FIGS. 5A to 5D are diagrams illustrating a process of growth of a metal nanoparticle according to an example embodiment. FIGS. 5A to 5C illustrate a surface viewed in a direction of <110>, a region corresponding to region ABB'A' illustrated in FIG. 2.

Figure 6:
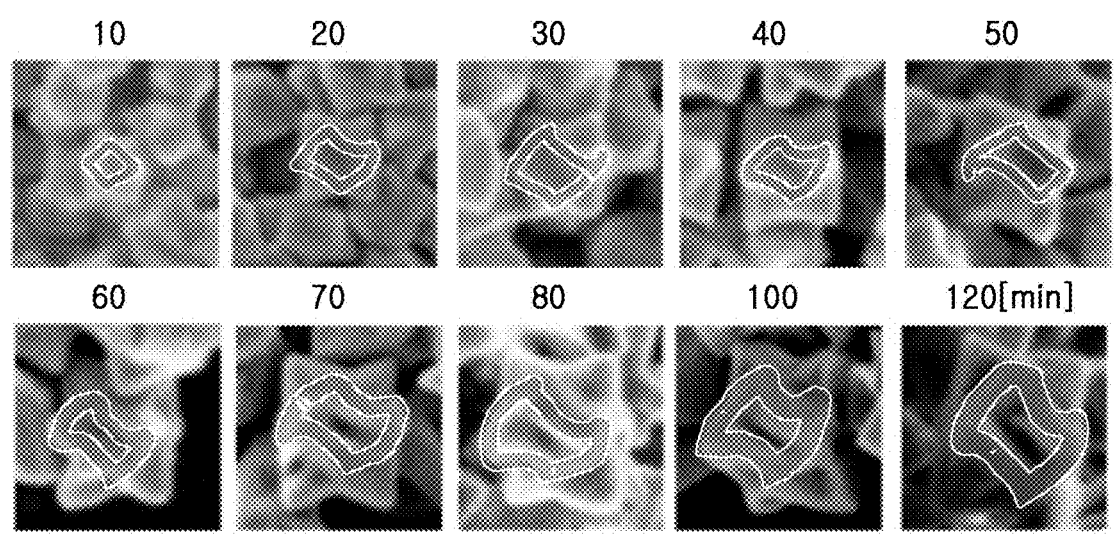
FIG. 6 is images showing a process of growth of a metal nanoparticle over time captured by an electron microscope according to an example embodiment of the present disclosure.

FIG. 6 is images showing a process of growth of a metal nanoparticle over time captured by an electron microscope according to an example embodiment.

In FIGS. 5A to 6, a structure fabricated using a first seed particle 10 having a cubic shape and formed of gold (Au) illustrated in FIG. 1 and using L-glutathione as an organic material 30 is illustrated. As illustrated in FIG. 5A, an edge of an external side of an R region may be extended outwardly, and an edge of an external side of an S region may be expanded inwardly such that the edges may form a curved line, and the edges may be grown such that a rhombus shape formed by ABB'A' region may be changed. Particularly, the edges may be changed to form an outwardly curved surface while both ends of the edges are almost fixed. In the R region, the edge may be curved outward, and in the S region, the edge may be curved inwardly. As illustrated in FIG. 6, the above-described growth may be performed for about 30 minutes. When D-glutathione is used as the organic material 30, the growth of the R region and the growth of the S region may be performed inversely in the present stage and in stages described below.

As a subsequent stage, as illustrated in FIG. 5B, the changed edge may be grown in a thickness direction, a width direction of the edge such that a thickness may increase. As in FIG. 6, the above-described growth in a thickness direction may be performed for about 80 minutes.

Thereafter, as illustrated in FIG. 5C, the changed edge may be grown in a height direction. Accordingly, the changed edge may be grown to protrude upwardly such that a space may be formed therein, and as illustrated in FIG. 6, the above-described growth in a length direction may be performed after 80 minutes.

Figure 5D:
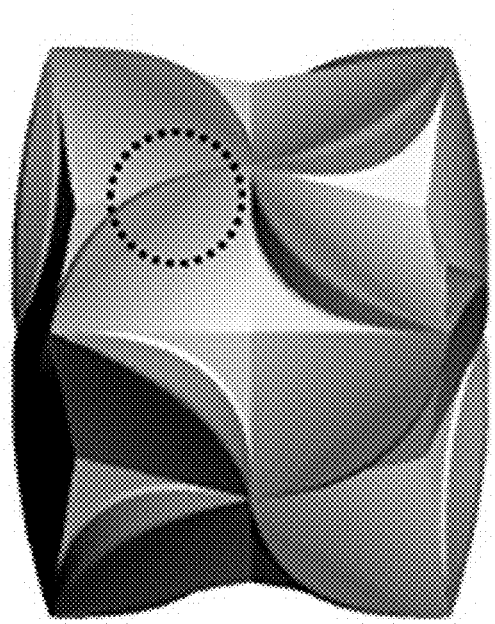

After going through the above-described growth processes, a metal nanoparticle having a chiral structure may be formed as illustrated in FIG. 5D. The metal nanoparticle may be grown from a first seed particle having a cubic shape to a second seed particle having a tetracontaoctagon shape, and as edges which do not correspond to the edges of the cubic shape of the first seed particle are changed and grown as described above, the metal nanoparticle may have a structure in which each of the edges has a curved surface. Each of the edges may have a curved or twisted shape such that the R regions may be expanded outwardly and the S regions may be expanded inwardly with reference to a corner taken in a direction of <110>.

As in FIGS. 3D and 5D, a metal nanoparticle having a different form may be grown depending on the organic material 30. That is because absorption configuration may be different depending on molecules of the organic material 30, and accordingly, growth may be induced in a different direction.

Figure 7:
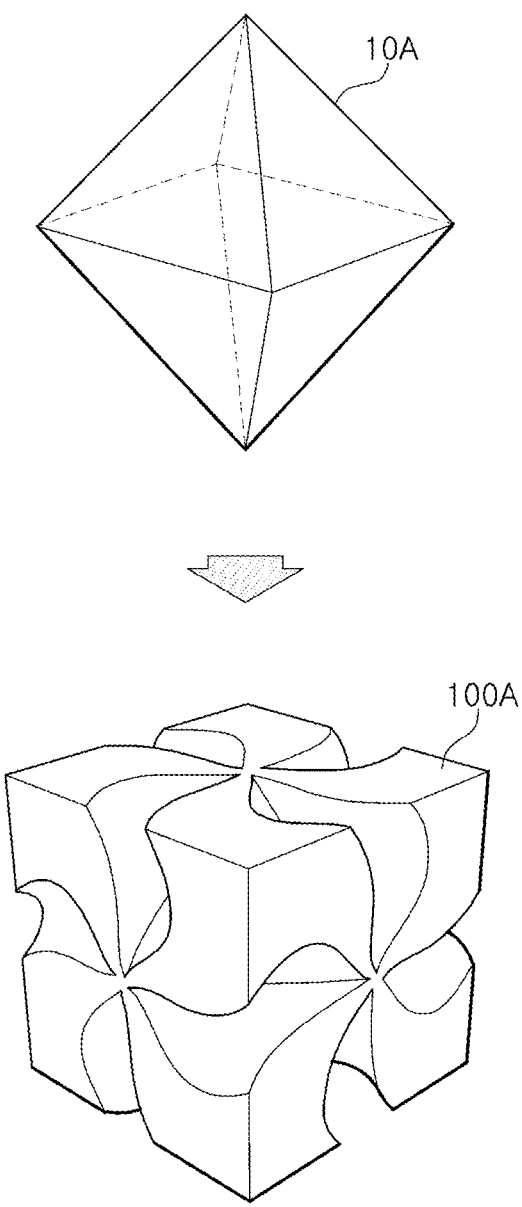
FIG. 7 is diagrams illustrating growth of a metal nanoparticle according to an example embodiment of the present disclosure.

FIG. 7 is diagrams illustrating a growth of a metal nanoparticle according to an example embodiment.

Figure 8:
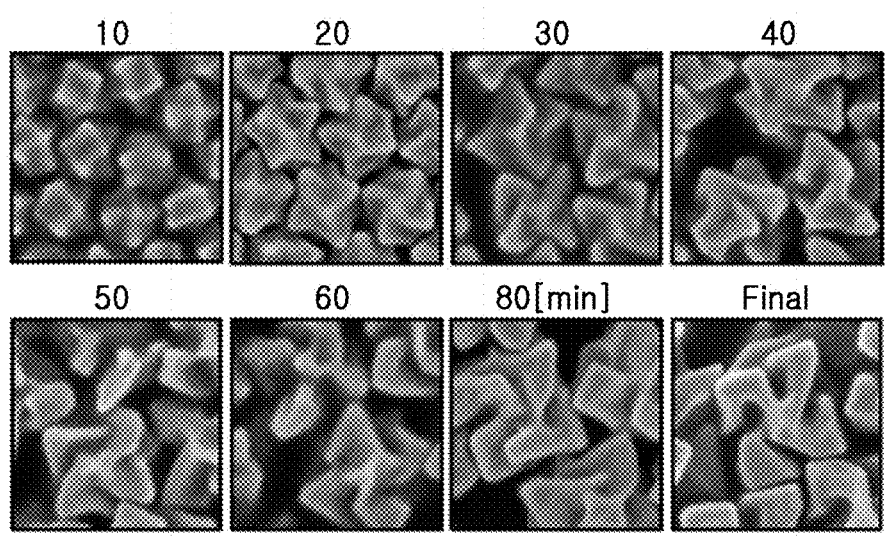
FIG. 8 is images showing a process of growth of a metal nanoparticle over time captured by an electron microscope according to an example embodiment of the present disclosure.

FIG. 8 is images showing a process of growth of a metal nanoparticle over time captured by an electron microscope according to an example embodiment.

In FIGS. 7 and 8, differently from the fabricating method described with reference to FIG. 1, a structure of a metal nanoparticle 100A formed of gold (Au), fabricated using a first seed particle 10A having a regular octahedron shape and formed of gold (Au) and using L-glutathione as an organic material 30, is illustrated. As illustrated in FIG. 8, as the first seed particle 10A having a regular octahedron shape is used, a shape of a particle corresponding to a second seed particle having a high Miller index, formed during fabricating the metal nanoparticle 100A, may be different from the example illustrated in FIG. 6. As compared to the example in FIG. 6, for example, after about 10 minutes, plane {100} may be grown to protrude relatively further than the example illustrated in FIG. 6. Accordingly, in a final structure, four curved surfaces may be formed in a form of a pinwheel in one direction, and a degree of curvature of the edges and a space formed according to the curvature may be different from the examples illustrated in FIG. 6. Also, in example embodiments, two of the four curved surfaces may be connected to each other to be a single surface.

Figure 9:
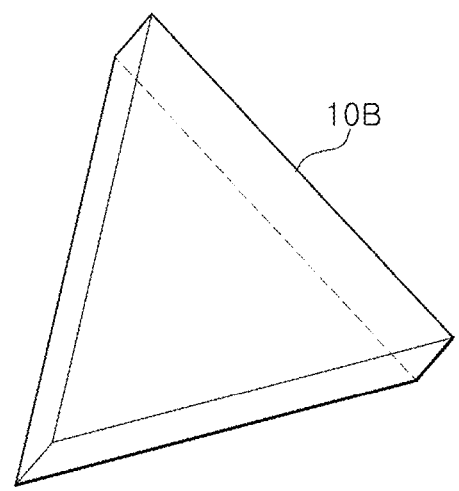
FIG. 9 is diagrams illustrating growth of a metal nanoparticle according to an example embodiment of the present disclosure.
Figure 9:
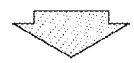
Figure 9:
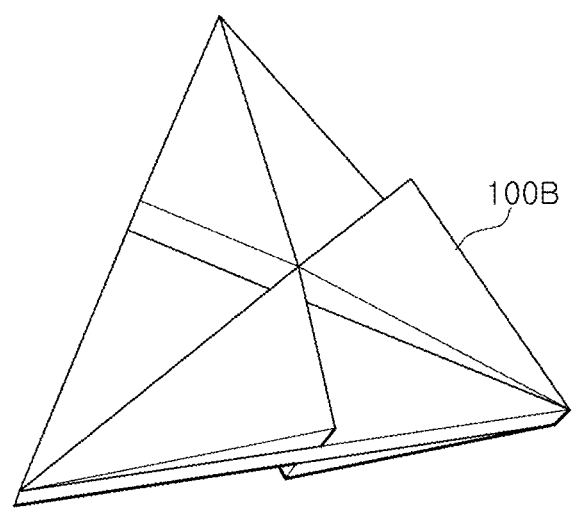

FIG. 9 is diagrams illustrating a growth of a metal nanoparticle according to an example embodiment.

Referring to FIG. 9, differently from the fabricating method described with reference to FIG. 1, a structure of a metal nanoparticle 100B formed of gold (Au), fabricated using a first seed particle 10B having a triangular prism shape and formed of gold (Au) and using L-glutathione as an organic material 30, is illustrated. As illustrated in FIG. 9, as the first seed particle 10B having a flat triangular prism shape, a triangular plate shape, is used, a shape of the finally formed metal nanoparticle 100B may be different from the example embodiments illustrated in FIGS. 3D, 4D, and 7.

Figure 10:
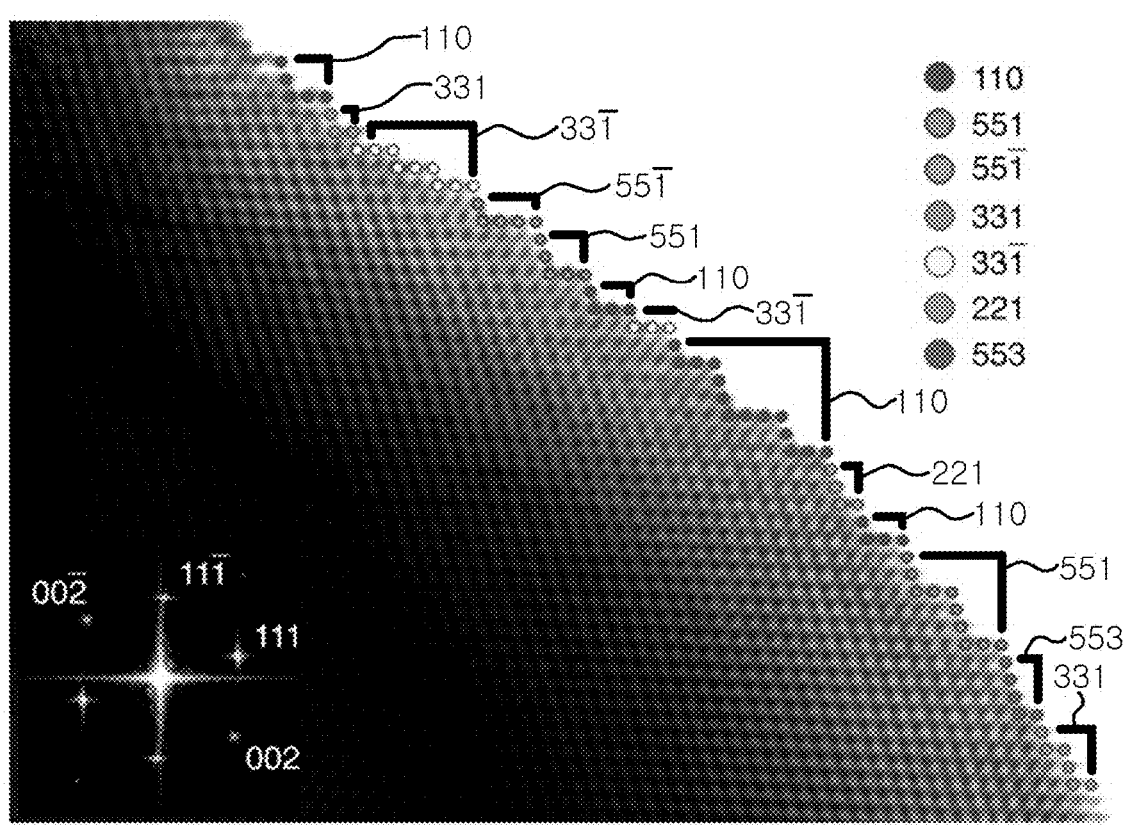
FIG. 10 is an image of a crystal plane of a surface of a metal nanoparticle according to an example embodiment of the present disclosure.

FIG. 10 is an image showing a crystal plane of a surface of a metal nanoparticle according to an example embodiment.

Figure 11A:
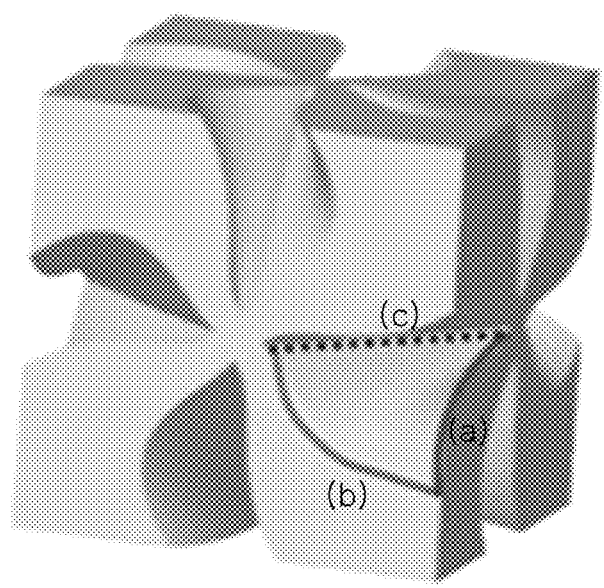
FIGS. 11A to 11C are diagrams illustrating a result of analysis of a crystal plane of a surface of a nanoparticle according to an example embodiment of the present disclosure.
Figure 11B:
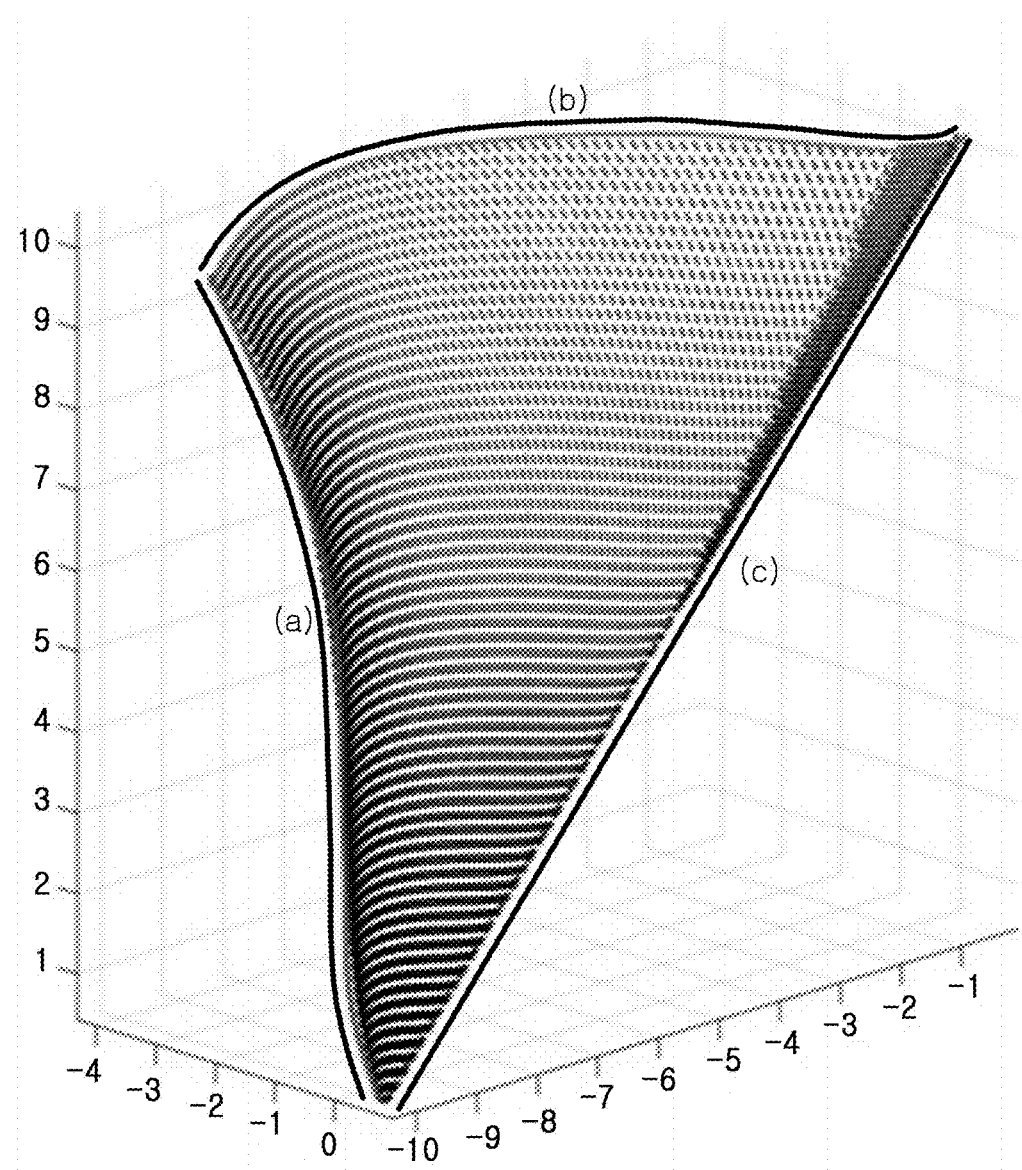
Figure 11C:
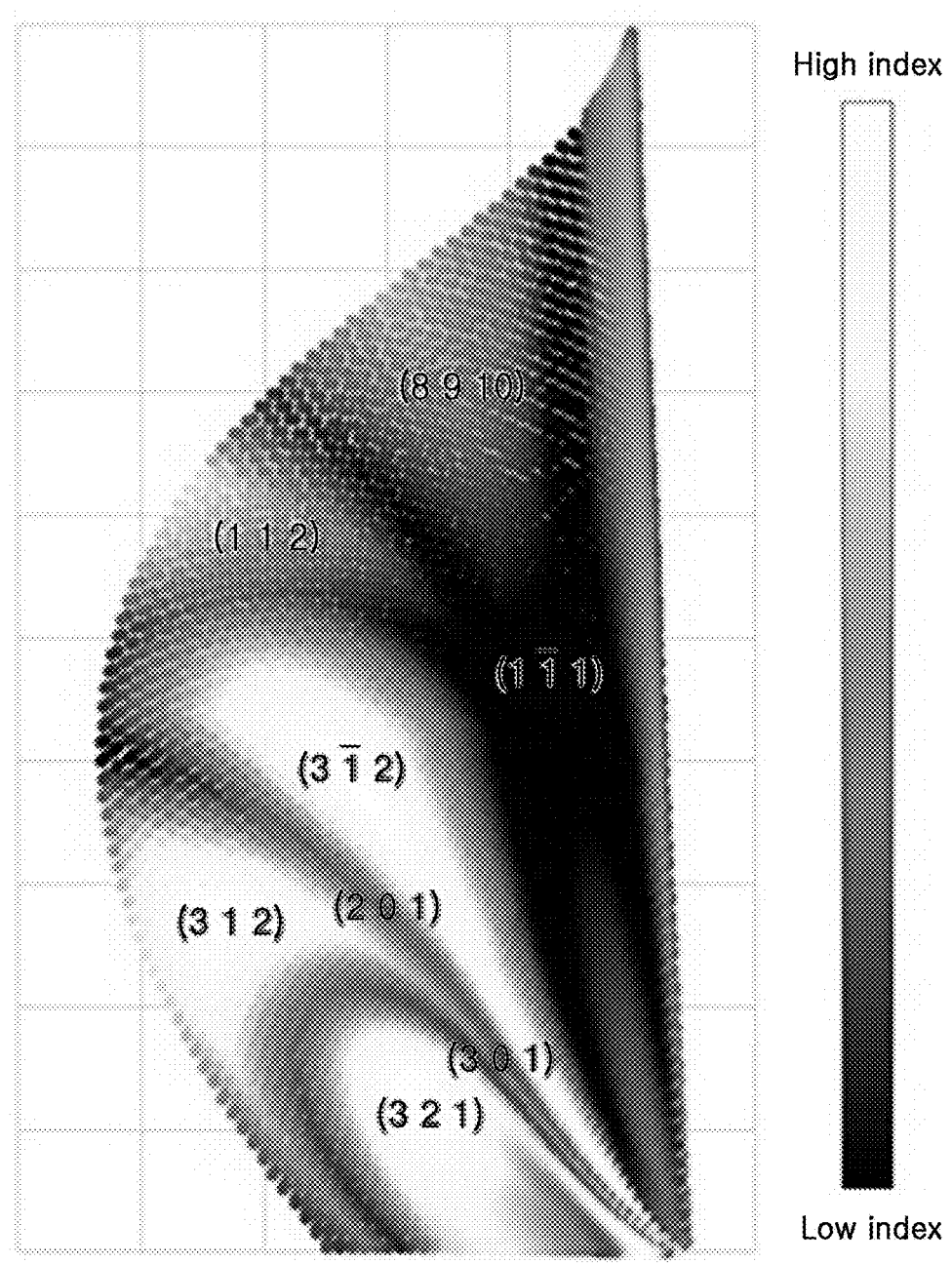

FIGS. 11A to 11C are diagrams illustrating a result of analysis of a crystal plane of a surface of a nanoparticle according to an example embodiment.

FIG. 10 illustrates a result of analysis of a crystal plane during growth of the metal nanoparticle described in the example embodiment with reference to FIGS. 3A to 4. Specifically, FIG. 10 illustrates a result of analysis in a state in which the nanoparticle is grown for about 20 minutes.

As illustrated in FIG. 10, the surfaces may be analyzed as high Miller index planes as {551}, {553}, {331}, and {221} according to an arrangement of atoms on the surfaces. Accordingly, the metal nanoparticle may have planes having a high Miller index.

FIGS. 11A to 11C illustrate a result of analysis of a crystal plane of the metal nanoparticle described in the example embodiment with reference to FIGS. 7 and 8. The finally fabricated metal nanoparticle may have the structure as in FIG. 11A, and an interpolated curved surface, formed by interpolating surfaces defined by (a), (b), and (c) in FIG. 11A, is illustrated in FIG. 11B. FIG. 11C illustrates distribution of a Miller index with respect to the curved surface. The distribution of a Miller index may be analyzed based on a value calculated from a normal vector at each point of the curved surface.

According to a result of the analysis in FIG. 11C, a surface of the nanoparticle included planes having a high Miller index as {8910}, {321}, and {301}. Accordingly, along with the above-described result, described with reference to FIG. 10, a surface of a metal nanoparticle may have an arrangement of atoms having a high Miller index during growth and even after growth.

Fabricating Three-Dimensional Chiral Heterometal Nanoparticle

Figure 12:
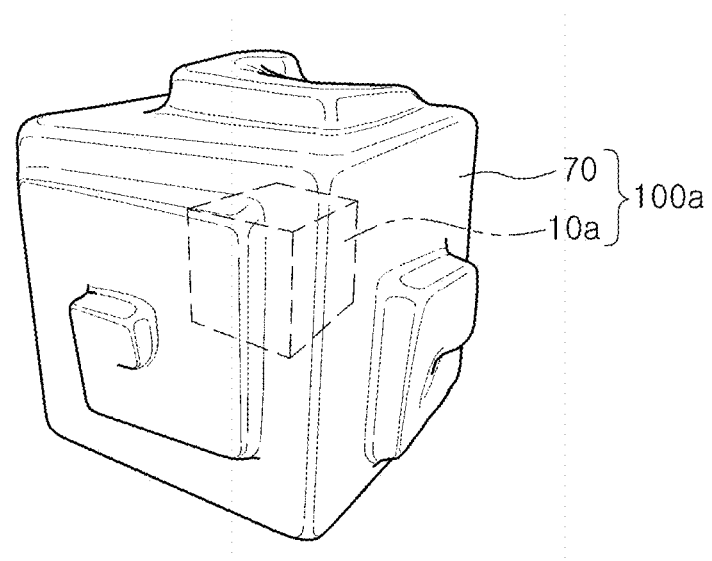
FIG. 12 is a schematic diagram illustrating a three-dimensional chiral heterometal nanoparticle according to an example embodiment of the present disclosure.

FIG. 12 is a schematic diagram illustrating a three-dimensional chiral heterometal nanoparticle according to an example embodiment.

In FIG. 12, a structure of a metal nanoparticle 100a fabricated using a first seed particle 10 having a cubic shape and formed of gold (Au) and using L-cysteine (Cys) as an organic material 30 is illustrated. The metal nanoparticle 100a was fabricated using tetrachloropalladinic acid (H2PdCl4) of a concentration of 1 μM as a second metal precursor 24 in the process of forming the second seed particle 50 described above. In other words, the metal nanoparticle 100a may be an Au—Pd metal nanoparticle fabricated by growing palladium (Pd), a heterometal, on the first seed particle 10 formed of gold (Au).

In an example embodiment, 125 μL of tetrachloropalladinic acid having a concentration of 10 mM, the second metal precursor 24, was added to 4.4 mL of CTAB having a concentration of 10 mM, the capping agent, 50 μL of the first seed particle 10 was added, 200 μL of hydrochloric acid (HCl) having a concentration of 0.5 M was added as a pH adjuster to adjust pH to 1.76, 25 μL of ascorbic acid having a concentration of 800 mM as the second reductant and 200 μL of cysteine (Cys) having a concentration of 0.025 mM as the organic material 30 were sequentially added, and reaction was maintained for three hours. In the example embodiment, the second growth solution may further include the pH adjuster such as hydrochloric acid or sulfuric acid, and the pH adjuster may control a speed of growth of the metal nanoparticle 100a by adjusting reduction reaction of metal ions. A pH of the second growth solution may be controlled to be 1.5 to 1.9. A temperature of growth of the metal nanoparticle 100a may be 40° C. approximately. In the description described with reference to FIGS. 12 to 17 below, the metal nanoparticle 100a may be considered to be fabricated under conditions of the above-described example embodiment unless otherwise indicated.

As illustrated in FIG. 12, the metal nanoparticle 100a may include a seed region 10a formed of gold (Au) and having a cubic shape or a shape similar to a cube, and a heterogeneous region 70 formed of palladium (Pd) on an external side. The metal nanoparticle 100a may be based on a cubic shape or a rectangular parallelepiped shape, and a rectangular band shape rotating in a clockwise direction may protrude on each plane of the metal nanoparticle 100a. The band shape may further protrude towards a center of a plane. For example, the metal nanoparticle 100a may have a protrusion bent and protruding in spiral staircase form from a surface of each plane. The spiral staircase form may form the protrusion in a form of a rectangular shape, a circular shape, or a rectangular shape in which a bent angle is smoothed. When D-cysteine (Cys) is used as the organic material 30, an Au—Pd metal nanoparticle having a form in which the band shape rotates in a counterclockwise direction may be formed.

As in the example embodiment, the metal nanoparticle 100a may be easily fabricated as various types of heterometal nanoparticles depending on usage using the first seed particle 10 having a cubic shape and formed of gold (Au) and also using a heterometal as the second metal precursor 24. The metal forming the heterogeneous region 70 is not limited to palladium (Pd), and various metals such as silver (Ag), copper (Cu), aluminum (Al), platinum (Pt), or the like, may be used. Particularly, when the heterogeneous region 70 is formed using palladium (Pd) as the metal nanoparticle 100a in the example embodiment, the metal nanoparticle 100a may be used in the field of a catalyst in accordance with properties of palladium (Pd), a catalyst activating material.

Figure 13A:
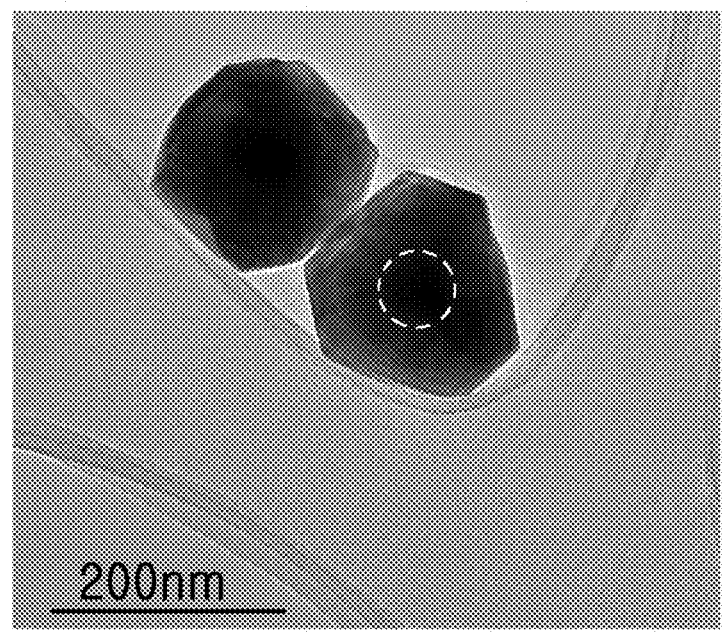
FIGS. 13A and 13B are an image of a metal nanoparticle captured by an electron microscope and a graph illustrating a result of analysis of a composition of a metal nanoparticle, respectively, according to an example embodiment of the present disclosure.
Figure 13B:
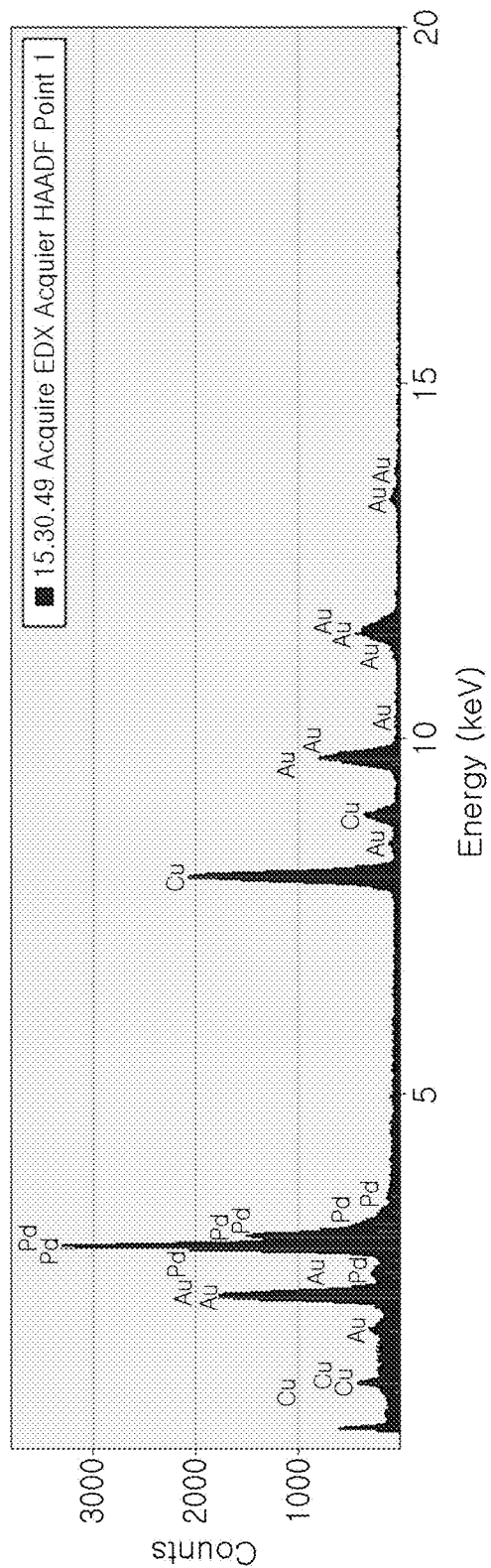

FIGS. 13A and 13B are an image of a metal nanoparticle captured by an electron microscope and a graph illustrating a result of analysis of a composition of a metal nanoparticle, respectively, according to an example embodiment. FIGS. 13A and 13B illustrate a result of analysis of the Au—Pd metal nanoparticle illustrated in FIG. 12.

Referring to FIG. 13A, the metal nanoparticle may include a seed region 10a therein, marked by a dotted line. The seed region 10a and a heterogeneous region 70 forming a chiral region on an external side may be indicated by different shadows on the image, and may include different materials. In FIG. 13A, a size of the metal nanoparticle may have a range of 100 nm to 200 nm. A size of the metal nanoparticle, however, is not limited thereto, and as described in the aforementioned example embodiment with reference to FIG. 1, the metal nanoparticle may have a size of 50 nm to 500 nm.

FIG. 13B illustrates a result of analysis of a composition using a transmission electron microscope energy dispersive x-ray spectroscopy (TEM EDX). The analysis of a composition was performed by disposing a sample of the metal nanoparticle on a copper (Cu) grid. Thus, in the result of the analysis, a peak of copper (Cu) was generated by the grid. Also, peaks corresponding to crystal planes of gold (Au) and palladium (Pd) were generated, and accordingly, it has been indicated that the metal nanoparticle included gold (Au) and palladium (Pd).

Figure 14:
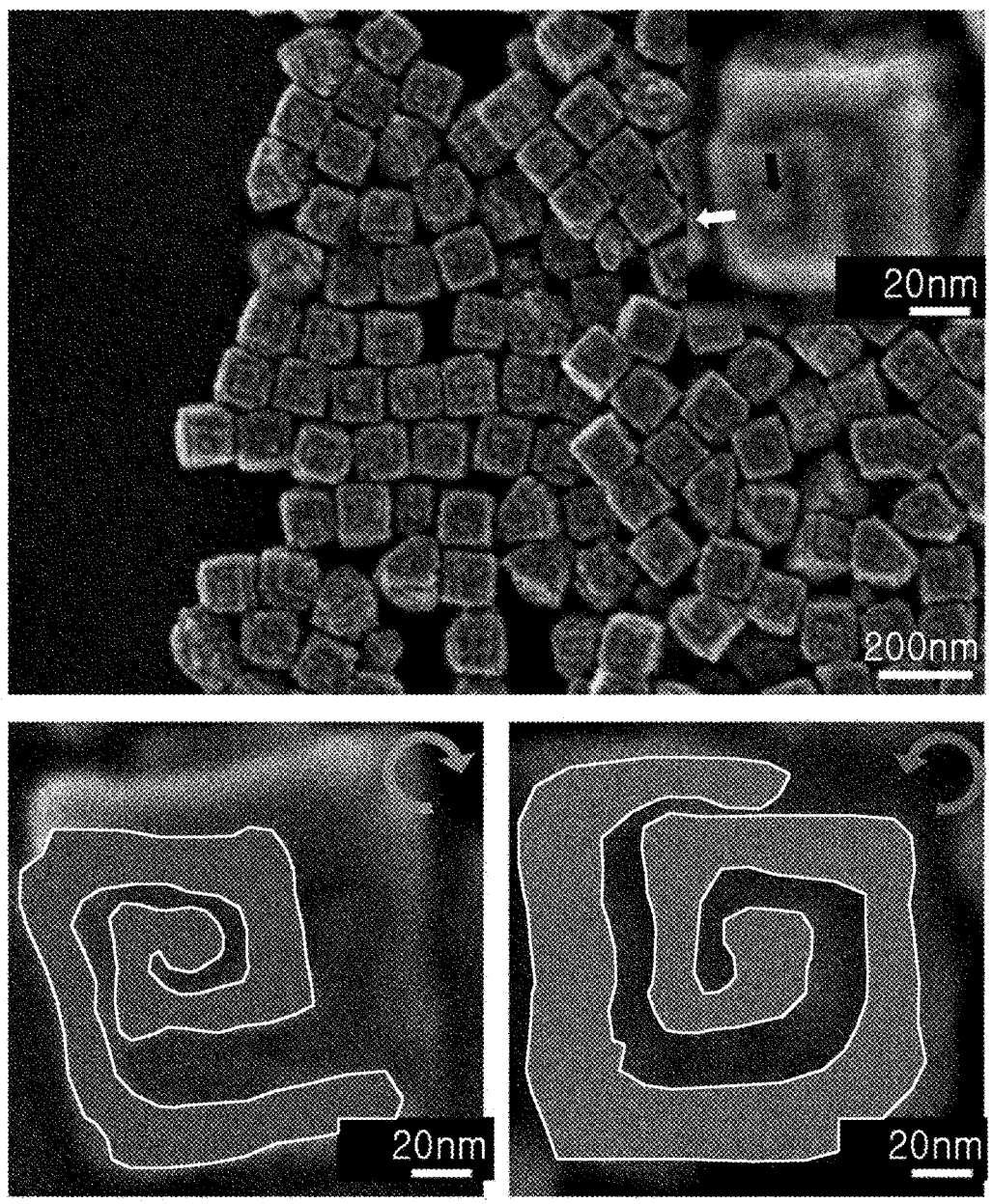
FIG. 14 is images obtained by analyzing a metal nanoparticle captured by an electron microscope according to an example embodiment of the present disclosure.

FIG. 14 is images obtained by analyzing a metal nanoparticle captured by an electron microscope according to an example embodiment.

FIG. 14 illustrates an image of the Au—Pd metal nanoparticle described with reference to FIGS. 12 to 13B, captured by using an electron microscope. A rotation direction of a protruding region of the Au—Pd metal nanoparticle may be determined in accordance with a type of the organic material 30 as described above.

As a result of analyzing 1170 metal nanoparticles, a ratio of metal nanoparticles clearly having a chiral structure appeared to be 30%. When the organic material 30 is L-cysteine (Cys), a ratio between a structure rotating in a clockwise direction and a structure rotating in a counterclockwise direction appeared to be 1.86:1. When the organic material 30 is D-cysteine (Cys), a ratio between a structure rotating in a clockwise direction and a structure rotating in a counterclockwise direction appeared to be 1:1.74. Thus, the Au—Pd metal nanoparticle may also have a different form depending on a type of the organic material 30.

Figure 15:
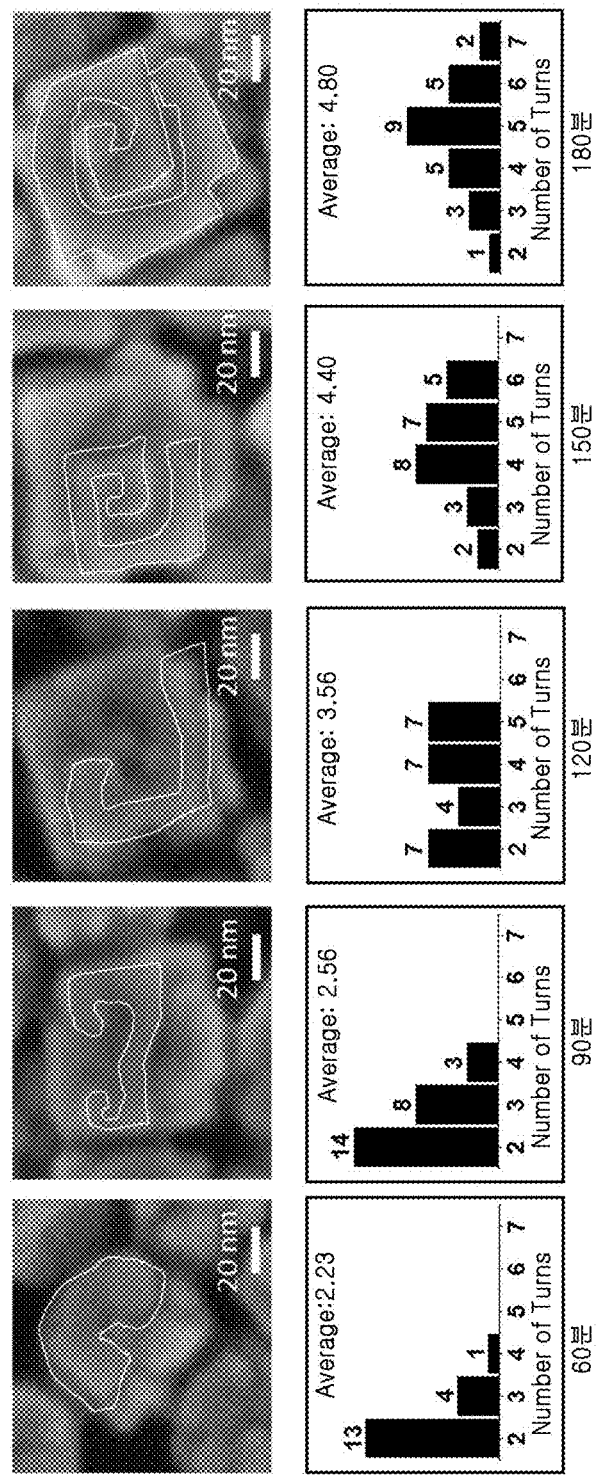
FIG. 15 is images showing a process of growth of a metal nanoparticle over time captured by an electron microscope according to an example embodiment of the present disclosure.

FIG. 15 is images showing a process of growth of a metal nanoparticle over time captured by an electron microscope according to an example embodiment.

FIG. 15 illustrates changes of a form of the Au—Pd metal nanoparticle described with reference to FIG. 12 in accordance with changes in growth time. The number of turns, the number of bending, tended to increase over time. A quadrangular band shape was bent almost twice for 60 minutes, and the number of the bending increased over time such that the quadrangular band shape was bent almost five times after 180 minutes approximately.

Figure 16:
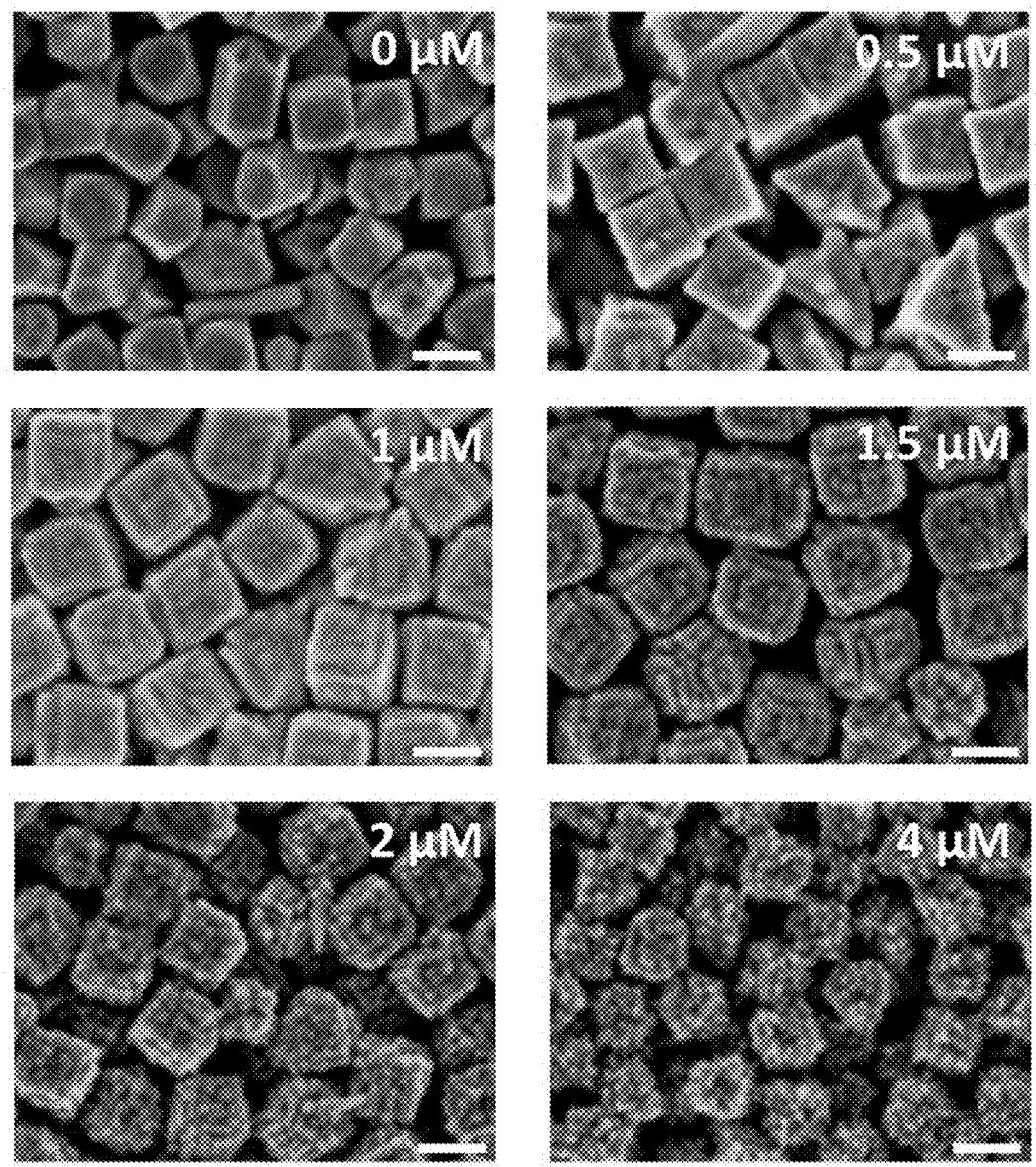
FIG. 16 is images of a structure of a metal nanoparticle captured by an electron microscope according to an example embodiment of the present disclosure.

FIG. 16 is images of a structure of a metal nanoparticle captured by an electron microscope according to an example embodiment.

FIG. 16 illustrates changes of a form of the Au—Pd metal nanoparticle described with reference to FIG. 12 in accordance with a concentration of cysteine (Cys), an organic material 30. As result of fabricating the Au—Pd metal nanoparticle while changing a concentration of the organic material 30 to 0 µM, 0.5 µM, 1 µM, 1.5 µM, 2 µM, and 4 µM, it has been indicated that the higher the concentration, the more the number of protrusions of the Au—Pd metal nanoparticle increased. Thus, when a concentration of the organic material 30 increased, irregular serrations such as protrusions on the surface tended to increase.

Accordingly, it has been indicated that a concentration of the organic material 30 directly affected a shape of the Au—Pd metal nanoparticle, and a chiral structure was apparently implemented at a concentration of 1 µM.

Figure 17:
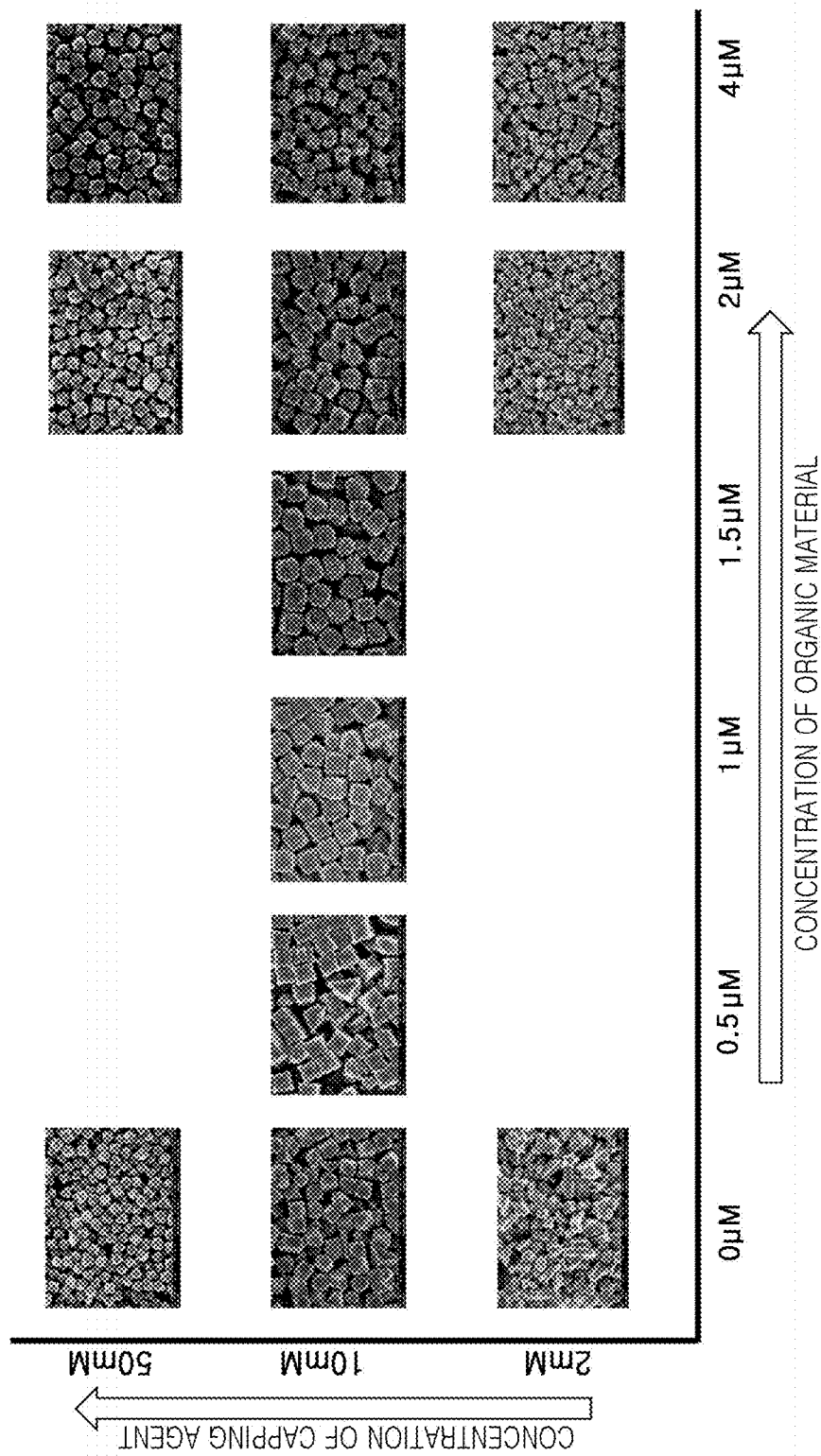
FIG. 17 is images showing a process of growth of a metal nanoparticle over time captured by an electron microscope according to an example embodiment of the present disclosure.

FIG. 17 is images showing a process of growth of a metal nanoparticle over time captured by an electron microscope according to an example embodiment.

FIG. 17 illustrates changes of a form of the Au—Pd metal nanoparticle described with reference to FIG. 12 in accordance with changes in concentration of cysteine (Cys), the organic material 30, and in concentration of CTAB, the capping agent. A result of fabricating the Au—Pd metal nanoparticle while changing a concentration of the organic material 30 to 0 µM, 0.5 µM, 1 µM, 1.5 µM, 2 µM, and 4 µM may be the same as in the aforementioned example embodiment described with reference to FIG. 16. According to the result of fabricating the Au—Pd metal nanoparticle while changing a concentration of the capping agent to 2 mM, 10 mM, and 50 mM, when the concentration is relatively low, 2 mM, uniformity of the metal nanoparticle did not appear to be maintained. When the concentration is relatively high, 50 mM, a chiral structure did not appear to be formed regardless of a concentration of the organic material 30. Thus, according to the example embodiment, an appropriate concentration of the capping agent was 10 mM, and both a concentration of the organic material 30 and a concentration of the capping agent affected a shape of the Au—Pd metal nanoparticle.

Structure of Three-Dimensional Chiral Nanostructure

Figure 18:
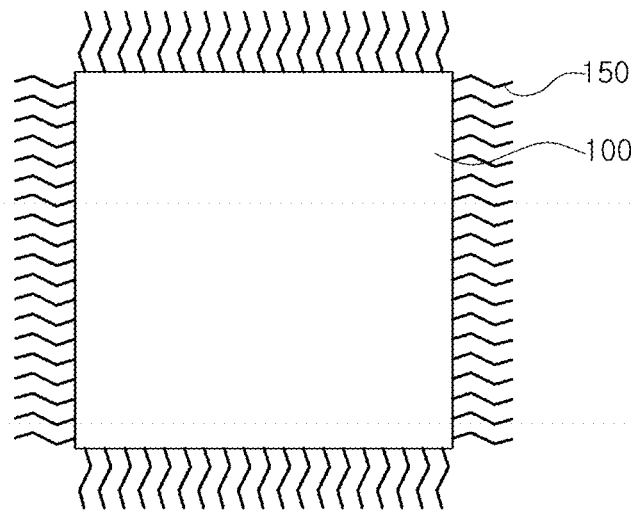
FIG. 18 is a schematic diagram illustrating a three-dimensional chiral nanostructure according to an example embodiment of the present disclosure.

FIG. 18 is a schematic diagram illustrating a three-dimensional chiral nanostructure according to an example embodiment.

Referring to FIG. 18, a three-dimensional chiral nanostructure 1000 in the example embodiment may include a metal nanoparticle 100 and an organic coating layer 150 enclosing the metal nanoparticle 100. The metal nanoparticle 100 may have a structure the same as the structure described with reference to FIGS. 3D, 5D, 7, 9, and 12.

The organic coating layer 150 may be formed by an organic material being absorbed to a surface of the metal nanoparticle 100. The organic coating layer 150 may include at least one of the surfactant, the capping agent, and the materials used as the organic material 30, used in the fabricating process described with reference to FIG. 1. For example, the organic coating layer 150 may include at least one of cetyltrimethylammonium bromide (CTAB), cetyltrimethylammonium chloride (CTAC), cetylpyridinium chloride (CPC), polyvinylpyrrolidone (PVP), cysteine (Cys), glutathione, cysteamine, 2-naphthalenethiol (2-NT), 4-aminothiophenol (4-ATP), 2-aminothiophenol (2-ATP), lipoic acid, and 3 3'-diethylthiatricarbocyanine iodide (DTDC I). The organic coating layer 150 may include a material including a thiol group used as the organic material 30. In this case, the organic coating layer 150 may be absorbed to one of an R region and an S region of the metal nanoparticle 100 in high concentration. When the organic coating layer 150 is formed of a material including a thiol group, the thiol group may be absorbed to the metal nanoparticle 100.

Figure 19A:
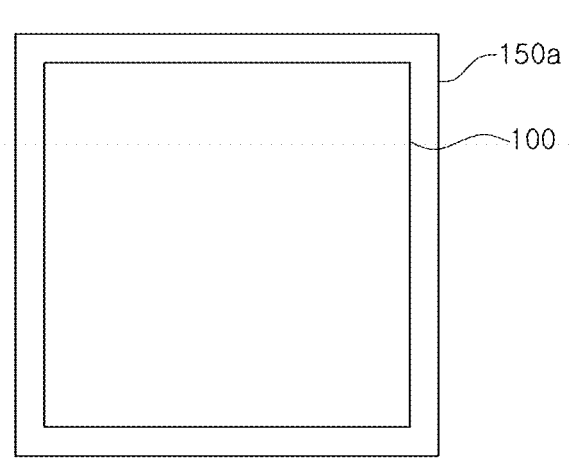
FIGS. 19A and 19B are a schematic diagram and an image captured by an electron microscope showing a three-dimensional chiral nanostructure, respectively, according to an example embodiment of the present disclosure.
Figure 19B:
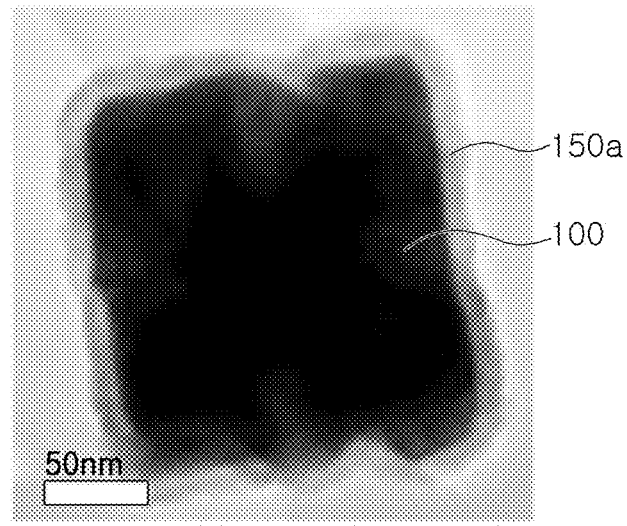

FIGS. 19A and 19B are a schematic diagram and an image captured by an electron microscope showing a three-dimensional chiral nanostructure, respectively, according to an example embodiment.

Referring to FIGS. 19A and 19B, a three-dimensional chiral nanostructure 1000a in the example embodiment may include a metal nanoparticle 100 and an organic coating layer 150a enclosing the metal nanoparticle 100. The metal nanoparticle 100 may have a structure the same as the structure described with reference to FIGS. 3D, 5D, 7, 9, and 12.

The organic coating layer 150a may be formed of a dielectric material, and may cover the metal nanoparticle 100. The organic coating layer 150a may include silica (SiO2), silicon nitride (SiNx), or the like, for example. The organic coating layer 150a may have a thickness of 3 nm to 100 nm, for example.

Figure 20:
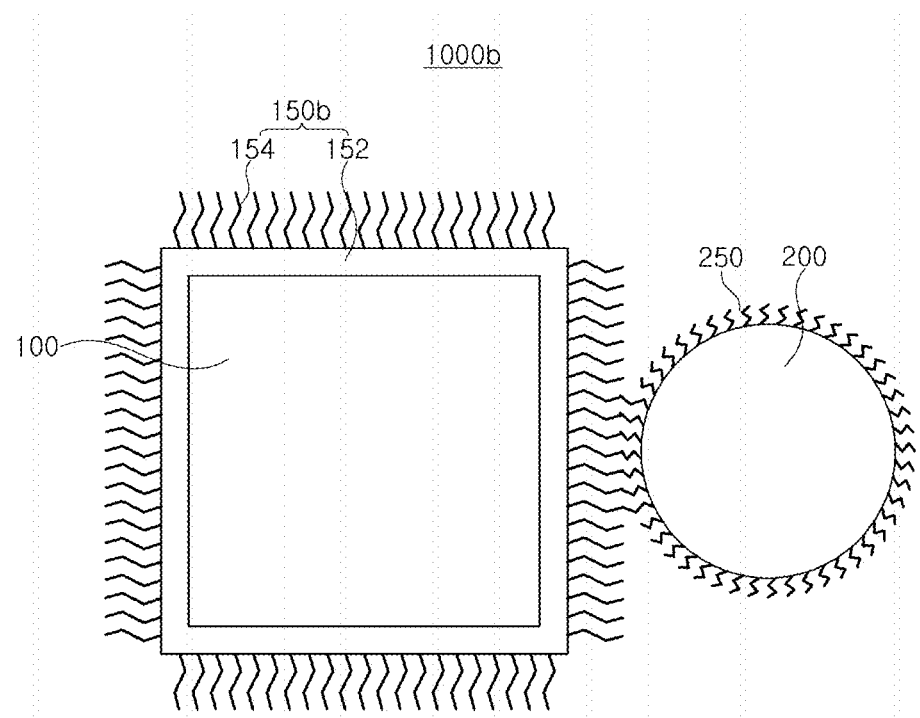
FIG. 20 is a schematic diagram illustrating a three-dimensional chiral nanostructure according to an example embodiment of the present disclosure.

FIG. 20 is a schematic diagram illustrating a three-dimensional chiral nanostructure according to an example embodiment.

Referring to FIG. 20, a three-dimensional chiral nanostructure 1000b in the example embodiment may include a metal nanoparticle 100, a coating layer 150b enclosing the metal nanoparticle 100, and a quantum dot 200 coupled to the metal nanoparticle 100 by the coating layer 150b. The metal nanoparticle 100 may have a structure the same as the structure described with reference to FIGS. 3D, 5D, 7, 9, and 12.

The coating layer 150b may include a first coating layer 152 formed of an inorganic material and a second coating layer 154 formed of an organic material.

The first coating layer 152 may be formed of an inorganic material, a dielectric, and may cover the metal nanoparticle 100. The first coating layer 152 may include silica (SiO2), silicon nitride (SiNx), or the like, for example. The first coating layer 152 may have a thickness of 3 nm to 70 nm, for example, and fluorescent properties of the three-dimensional chiral nanostructure 1000b may be adjusted in accordance with a thickness of the first coating layer 152. For example, when the thickness is greater than the above-described range, an effect of improving fluorescent properties may decrease. When the thickness is less than the above-described range, fluorescence may be quenched. For example, when the first coating layer 152 has a relatively great thickness, a distance between the metal nanoparticle 100 and the quantum dot 200 may increase such that an effect of increase of an electric field caused by plasmon on a surface of the metal nanoparticle 100 may be less affective, and when the first coating layer 152 has a relatively thin thickness, fluorescence may not occur in the quantum dot 200 and energy may be transferred to the metal nanoparticle 100.

The second coating layer 154 may be formed of an organic material, and may be formed by an organic material being absorbed to the first coating layer 152. The second coating layer 154 may have an amine group, and the amine group may be exposed outwardly, but an example embodiment thereof is not limited thereto. For example, the second coating layer 154 may be 3-aminopropyltrimethoxysilane (Si(OC2H5)3C3H7NH2, ATPMS)

The quantum dot 200 may be formed of a semiconductor material or a conductive material, and a material of the quantum dot 200 may be varied depending on a purpose of a function of the three-dimensional chiral nanostructure 1000b. The quantum dot 200 may be formed of silicon (Si) or a compound semiconductor, for example. When the three-dimensional chiral nanostructure 1000b is used as a display material for using optical properties, the quantum dot 200 may include a II-VI group compound semiconductor such as CdSe. The quantum dot 200 may have a size of 2 nm to 500 nm, for example.

An organic ligand 250 may be coated on the quantum dot 200. The organic ligand 250 may have a carboxylic acid group, for example, and the carboxylic acid group may be exposed outwardly, but an example embodiment is not limited thereto.

The second coating layer 154 and the organic ligand 250 may be chemically coupled to each other, and accordingly, the metal nanoparticle 100 may be coupled to the quantum dot 200. In example embodiments, the second coating layer 154 and the organic ligand 250 may be coupled to each other by a cross linker. For example, when the second coating layer 154 has an amine group, and the organic ligand 250 has a carboxylic acid group, an amine group and a carboxylic acid may be coupled to each other by a cross linker such as 1-ethyl-3-(3-dimethylaminopropyl)carbodiimide (EDC).

Figure 21A:
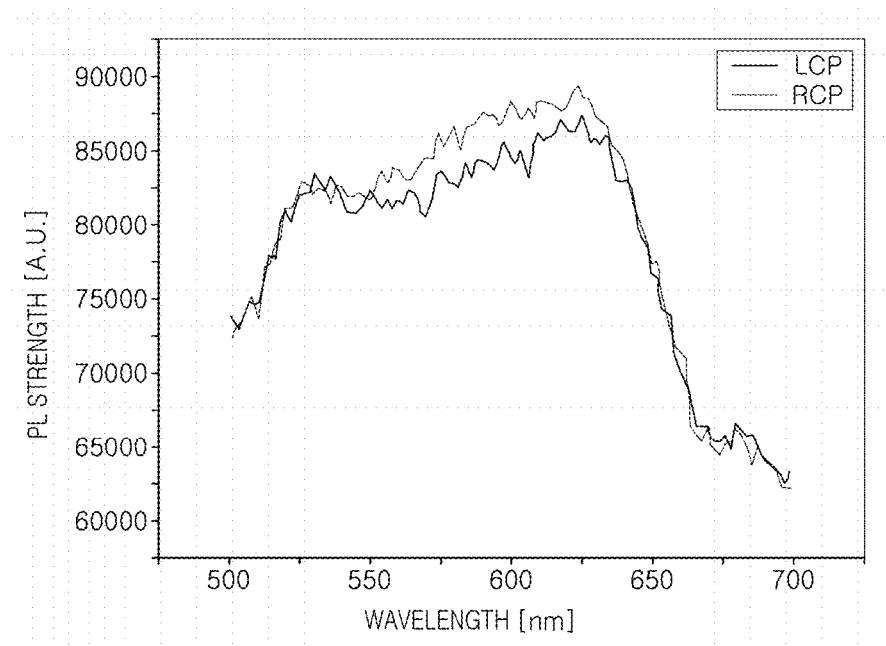
FIGS. 21A and 21B are graphs illustrating optical properties of a three-dimensional chiral nanostructure according to an example embodiment of the present disclosure.
Figure 21B:
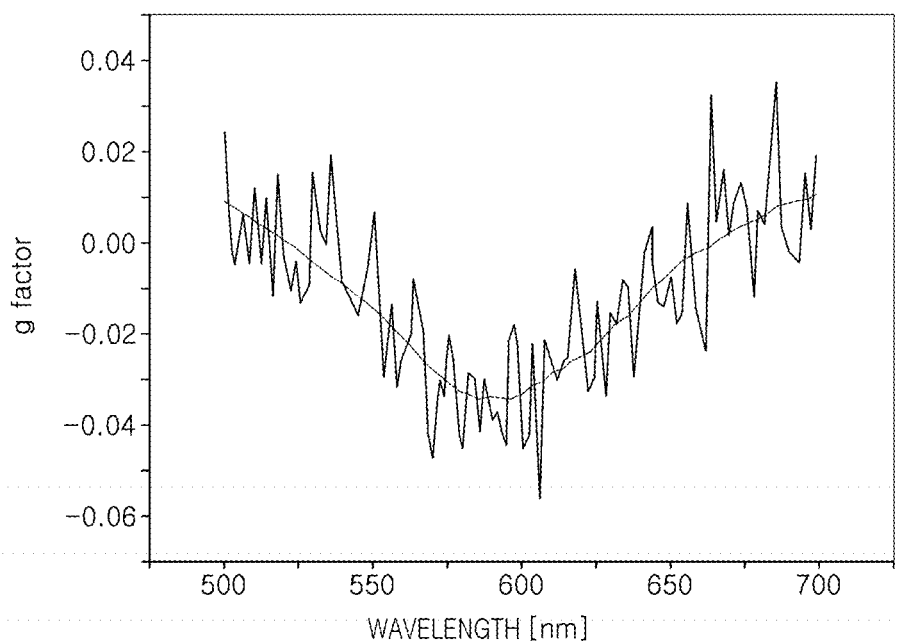

FIGS. 21A and 21B are graphs illustrating optical properties of a three-dimensional chiral nanostructure according to an example embodiment.

FIGS. 21A and 21B illustrate a result of analysis of an emission spectrum and a g-factor of a three-dimensional chiral nanostructure 1000b having the structure described with reference to FIG. 20. Specifically, the three-dimensional chiral nanostructure 1000 used in the analysis may have a structure including a metal nanoparticle 100 formed of gold (Au), a first coating layer 152 formed of silica, and a quantum dot 200 formed of CdSe. A thickness of the first coating layer 152 was 10 nm approximately.

The three-dimensional chiral nanostructure in the example embodiment may have circular dichroism due to chiral structural properties. Accordingly, the three-dimensional chiral nanostructure may emit circular polarized light (CPL). In the case of the three-dimensional chiral nanostructure 1000b coupled to the quantum dot 200, electrons in the quantum dot 200 may be excited by CPL emitted from the metal nanoparticle 100 due to near field excitation such that the three-dimensional chiral nanostructure 1000b may exhibit circular polarized fluorescence. In this case, quenching of fluorescence caused by transfer of energy may be prevented by the first coating layer 152.

As illustrated in FIG. 21A, the three-dimensional chiral nanostructure 1000b exhibited polarized properties near 600 nm, instead of a full wavelength, and fluorescence of right polarization increased. When the chiral metal nanoparticle 100 is coupled to an achiral quantum dot or fluorescence as described above, chiral fluorescence may be emitted. As illustrated in FIG. 21B, a g-factor indicating a quantified value of a degree of asymmetry of circular polarization appeared to be 0.04.

According to the result described above, by using the three-dimensional chiral nanostructure described in the example embodiment, an optical material which may emit CPL light may be fabricated by combining a chiral metal nanoparticle with an achiral fluorescent material without a complex process for making a dye chiral.

While the example embodiments have been shown and described above, it will be apparent to those skilled in the art that modifications and variations could be made without departing from the scope of the present invention as defined by the appended claims.

INDUSTRIAL APPLICABILITY

A chiral structure in the example embodiment may have various shapes and may be easily produced such that the chiral structure may be widely used in the fields of optical materials and catalysts using optical activation properties of the chiral structure. For example, the chiral structure in the example embodiment may be used in an optical antenna, an optical filter, a display, a single-molecule detection technique, disease diagnosis technology, a chemical and physical sensor, eco-friendly energy, production of chemical resources, and others.

The invention claimed is:

1. A three-dimensional chiral nanostructure, comprising:
a metal nanoparticle having a chiral structure; and
a coating layer enclosing the metal nanoparticle,
wherein the metal nanoparticle has a polyhedral structure having an R region in which an arrangement of atoms changes in a clockwise direction and an S region in which an arrangement of atoms changes in a counterclockwise direction, in an order of (111), (100), and (110) with reference to a chiral center, where at least a portion of edges of the metal nanoparticle is tilted or changed to form a curved line, and expanded from the R region or the S region and forms a curved surface such that the metal nanoparticle has a chiral structure.

2. The three-dimensional chiral nanostructure of claim 1, wherein the coating layer is formed of an inorganic material that is a dielectric.

3. The three-dimensional chiral nanostructure of claim 2, wherein the coating layer includes silica ($SiO_2$).

4. The three-dimensional chiral nanostructure of claim 2, wherein the metal nanoparticle has a size of 50 nm to 500 nm, and the coating layer has a thickness of 3 nm to 70 nm.

5. The three-dimensional chiral nanostructure of claim 1, wherein the coating layer is an organic material including a thiol group.

6. The three-dimensional chiral nanostructure of claim 5, wherein the organic material is absorbed to one of the S region and the R region in relatively high concentrations.

7. The three-dimensional chiral nanostructure of claim 1, wherein the metal nanoparticle includes a seed region formed of a first metal, and a heterogeneous region disposed on an external side of the seed region to enclose the seed region and formed of a second metal.

8. The three-dimensional chiral nanostructure of claim 1, wherein the coating layer is at least one of cetyltrimethylammonium bromide (CTAB), cetyltrimethylammonium chloride (CTAC), cetylpyridinium chloride (CPC), polyvinylpyrrolidone (PVP), cysteine (Cys), and glutathione.

9. The three-dimensional chiral nanostructure of claim 1, further comprising:
a quantum dot coupled to the metal nanoparticle by the coating layer.

10. The three-dimensional chiral nanostructure of claim 9, wherein the coating layer includes a first coating layer formed of an inorganic material and a second coating layer formed of an organic material and absorbed to the first coating layer, and
wherein the quantum dot is connected to the second coating layer.

11. The three-dimensional chiral nanostructure of claim 10,
wherein the second coating layer has an amine group, and
wherein the quantum dot has an organic ligand having a carboxylic acid group.

12. The three-dimensional chiral nanostructure of claim 9, wherein the quantum got includes silicon or a compound semiconductor.

13. A three-dimensional chiral nanostructure, comprising:
a metal nanoparticle having a polyhedral structure including an R region in which atoms are arranged in a clockwise direction and an S region in which atoms are arranged in a counterclockwise direction, in an order of crystal planes of (111), (100), and (110) with reference to a chiral center, where at least a portion of edges of the metal nanoparticle is tilted or changed to form a curved line, and expanded from the R region or the S region and forms a curved surface such that the metal nanoparticle has a chiral structure.

14. The three-dimensional chiral nanostructure of claim 13, wherein at least a portion of a surface of the metal nanoparticle is planes having a high Miller index.

15. The three-dimensional chiral nanostructure of claim 14, wherein the planes having a high Miller index include at least one of planes {221}, {551}, {553}, and {331}.

16. The three-dimensional chiral nanostructure of claim 13, wherein the expanded edge has a twisted form, twisted by a certain angle with reference to a corner of the polyhedral structure.

17. The three-dimensional chiral nanostructure of claim 13, wherein the expanded edge is tilted from one of the R region and the S region to the other on a boundary between the R region and the S region.

18. The three-dimensional chiral nanostructure of claim 17, wherein the tilted edge extends to an adjacent region in a length direction of the edge.

19. The three-dimensional chiral nanostructure of claim 13, wherein the expanded edge expands in a direction of an external side of one of the R region and the S region and forms an outwardly curved shape.

20. The three-dimensional chiral nanostructure of claim 19, wherein the expanded edge is grown in a height direction of the edge and has a protruding shape.

* * * * *